United States Patent [19]

Cornelia et al.

[11] Patent Number: 6,065,026
[45] Date of Patent: May 16, 2000

[54] MULTI-USER ELECTRONIC DOCUMENT AUTHORING SYSTEM WITH PROMPTED UPDATING OF SHARED LANGUAGE

[75] Inventors: Edward J. Cornelia, Belmont; Benjamin Fine, Boston; Jonathan D. Jacobs, Chestnut Hill; Neal J. Karasic, Cambridge, all of Mass.

[73] Assignee: Document.com, Inc., Boston, Mass.

[21] Appl. No.: 08/874,262

[22] Filed: Jun. 13, 1997

Related U.S. Application Data

[60] Provisional application No. 60/034,663, Jan. 9, 1997.

[51] Int. Cl.⁷ .................................................. G06F 17/24
[52] U.S. Cl. .......................................... 707/531; 707/511
[58] Field of Search ................................... 707/501, 505, 707/511, 512, 513, 514, 515, 530, 531, 539, 540, 8, 104

[56] References Cited

U.S. PATENT DOCUMENTS

| 5,113,341 | 5/1992 | Kozol et al. . | |
|---|---|---|---|
| 5,181,162 | 1/1993 | Smith et al. . | |
| 5,280,574 | 1/1994 | Mizuta et al. | 707/511 |
| 5,341,469 | 8/1994 | Rossberg et al. | 707/514 |
| 5,367,621 | 11/1994 | Cohen et al. | 707/501 |
| 5,537,526 | 7/1996 | Anderson et al. . | |
| 5,581,682 | 12/1996 | Anderson et al. | 707/530 |
| 5,655,130 | 8/1997 | Dodge et al. | 707/511 |
| 5,671,428 | 9/1997 | Muranga et al. | 345/329 |
| 5,745,910 | 4/1998 | Piersol et al. | 707/515 |

OTHER PUBLICATIONS

Brian W. Kernighan, "Issues and Tradeoffs in Document Preparation Systems," AT&T Bell Laboratories, Murray Hill, New Jersey, dated before March of 1997.

David M. Levy, "Topics in Document Research," ACM Conference on Document Processing Systems, Santa Fe, NM, Dec. 5–9, 1988.

*Primary Examiner*—Stephen S. Hong
*Attorney, Agent, or Firm*—Kristofer E. Elbing

[57] ABSTRACT

An electronic document authoring system and method that feature maintaining a library of textual components, displaying a document including some of them in a word processor window, responding to user input to an interface of the word processor to edit the document while it is displayed in the window, and maintaining a database of marks identifying each of the components within the document displayed in the window. The system and method also feature responding to user input to edit another document including components, updating some of the components that belong to both documents, and generating a second version of the documents that include updated components.

48 Claims, 15 Drawing Sheets

MULTI-USER ELECTRONIC DOCUMENT AUTHORING SYSTEM WITH PROMPTED UPDATING OF SHARED LANGUAGE

CROSS-REFERENCE TO RELATED APPLICATION

This application claims the benefit under 35 U.S.C. § 119(e) of provisional application No. 60/034,663, filed Jan. 9, 1997, which is herein incorporated by reference.

FIELD OF THE INVENTION

This invention relates to computer-based document authoring and assembly systems.

BACKGROUND OF THE INVENTION

Authors of documents and forms that include a substantial amount of standard text can now use computers to generate forms and assemble documents. Form generation software automates data entry tasks by prompting a user for data, inserting those data in their proper place in a form, and then printing a completed version of the form or inserting an electronic version of the completed form in a word processing document. Existing document assembly systems typically lead a user through a series of questions, generate a document made up of text selected based on the responses to the questions, and then print the assembled documents or allow them to be exported to a word processor.

Automated document assembly appears to be particularly advantageous for attorneys and other individuals who prepare long legal or transactional documents. Using computers to assemble documents reduces the amount of time that these individuals spend on the mechanics of document preparation. But document assembly systems are not universally used, and current software does not provide an optimal solution to the problem of multiple users generating, updating, and maintaining a number of different, but overlapping, documents.

SUMMARY OF THE INVENTION

In general, the invention features maintaining a library of textual components, displaying a document including some of them in a word processor window, responding to user input to an interface of the word processor to edit the document while it is displayed in the window, and maintaining a database of marks identifying each of the components within the document displayed in the window. The invention also features responding to user input to edit another document including components, updating some of the components that belong to both documents, and generating a second version of the documents that include updated components.

In particular embodiments, the invention features prompting the user to accept or reject component updating for each of the components to be updated; prompting the user to accept or reject each updated component to include in the documents; automatically prompting the user to save changes to the components in a document made during editing to the library upon detection of a user command to save the document; generating questionnaires, receiving user input to complete the questionnaires, and updating in response to the input at least a portion of the components; generating, in response to user input, a report on when the questionnaires were last completed; generating, in response to user input, a report on which of the documents includes a particular one of the components in the library; generating, in response to user input, a report on which portions of the documents include flagged compliance text; maintaining revision history and comments associated with the components in the library, and displaying the revision history and comments in response to user input related to a particular one of the components; displaying boundaries of the components in the word processor window; maintaining ones of the textual components in the library that include variation fields, and updating the variation fields in response to a user command; maintaining an indication of whether the updates to each of the components require review; maintaining a classification field, and identifying to the user new components that may be relevant to one of the documents based on the classification field; responding to user input to the interface of the word processor to flag text in the documents; maintaining an expiration date field and preventing textual components associated with expired dates from being included in the documents; making word processing commands and commands related to the components in the library available to the user simultaneously; maintaining a draft field to indicate whether textual information is in draft or final form; responding to a user copy command to create another document from the components that make up the first document; maintaining information on a component's name, description, and classifications; maintaining information on a component's regulatory information, revision, comments, and its read only and review required status; communicating between the library and the user interface over a computer network, such as a global computer network; and managing the documents in a document management system.

Embodiments according to the invention can extend the word processing environment to enable sophisticated users, such as members of a legal department, to organize and maintain shared language components that exist within a series of documents, and to allow those users to maintain consistent language, such as legal language, across those documents.

GLOSSARY OF TERMS

This glossary serves to define the language used throughout this application.

ATTRIBUTE: Attributes are information pertaining to components. Attributes may include regulatory information, author, compliance links, revision information, prospectus family, etc.

COMPONENT: A unit of text that is shared among documents. Within a component, there may be variable text in order to facilitate flexibility and foster re-use.

DRAFT COMPONENT: A component that has been saved to the library, but it still being worked on. Saving a component as a draft lets a user work on several documents at a time and share wording that has not yet been finalized.

FINAL COMPONENT: A component whose wording has been finalized. While a user is changing a component they may wish to save it as a draft. When all of the review comments have been collected and the user is satisfied with the text of the component, he or she can save it as final.

QUESTIONNAIRE: A list of questions associated with a given document which, when filled in, gives the content for the variable text areas of a component.

REDLINING: The process by which two pieces of text are compared and the differences highlighted by strikethrough and underline formatting of the text.

LIBRARY: The storage area for components which allows for standard language re-use. Language components stored in the library may be assembled in order to create a new document.

SYSTEM FUNCTION: A system function is a single operation which the system performs for the user. For example, the Find New Components system function identifies the new language components within the library.

TAG: Used to group selected sections of a document. For example, a user can tag any text in a document as being "compliance" text. At any point, a user can then run a report listing all "compliance" text in the document. This report can be the basis for the compliance checklist created for a board of directors.

TASK: A series of system functions performed by the user to accomplish a goal. For example, revising a document is a task that requires many system functions.

VARIABLE TEXT: Text within a component which varies from document to document or between updates of the same document. This includes dates, fees, fund name, etc.

VARIATIONS: Text within a component that may varies depending upon the document containing the component. For example, a component variation may be the word "stock" or "bond". The user can choose between the version of the component with the word "stock" or the word "bond" depending upon the type of document that they are editing.

BRIEF DESCRIPTION OF THE DRAWINGS

FIG. 16 is a drawing of a find component dialog for use with the authoring system of FIG. 1;

FIG. 17 is a drawing of a find document dialog for use with the authoring system of FIG. 1;

DETAILED DESCRIPTION OF AN ILLUSTRATIVE EMBODIMENT

Figure 1:
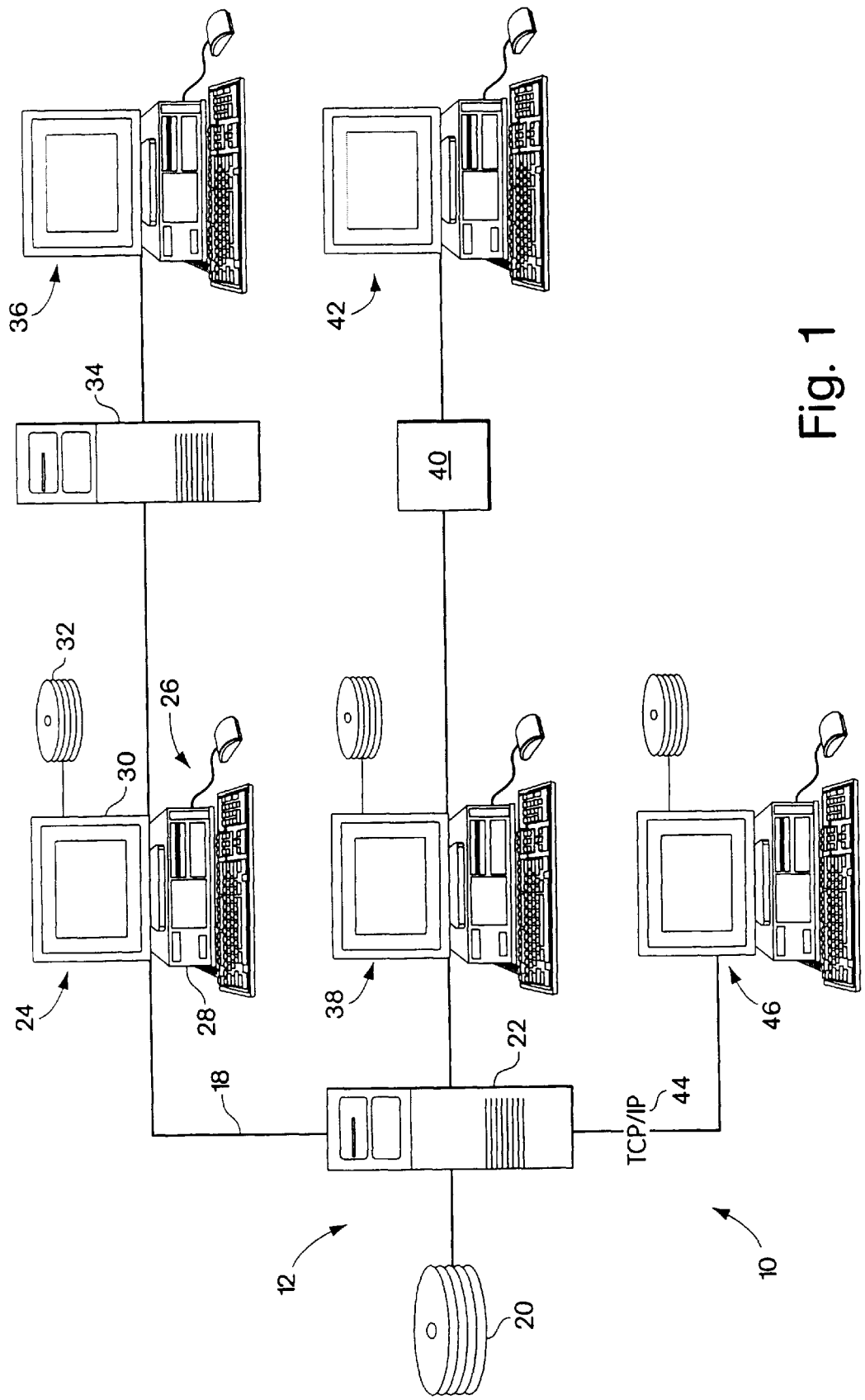
FIG. 1 is a general hardware layout diagram for an illustrative document authoring system according to the invention.

Referring to FIG. 1, an illustrative document authoring system 10 runs on a hardware layout that includes a database server 12 networked with one or more clients (e.g., 24, 38, 46). The server includes a server processing system 22 and database storage 20. The server processor can run a standard Relational Data Base Management System (RDBMS) server package, such as A Structured Query Language (SQL) server, which stores entities which comprise the library in the server storage. The server can employ off-the-shelf software and hardware components, and in one embodiment employs the Windows NT Advanced Server version 4.0 and SQL Server version 6.5.

The first client machine 24 can be networked with the server 12 via a data path 18. As it is well known, the client machine can include input devices 26, a processor or processing system 28, a display 30, and storage 32, such as local disk storage. A network file server 34 can also be connected to the network data path, as can be a questionnaire user machine 36, which has no direct library access.

The authoring system 10 can also include one or more remote library user machines 42, which allow users to interact with the system without being directly connected to the server. Users of these machines can have access to appropriate files via a file server or floppy disk 40 transfer, allowing for off-site editing and questionnaire completion.

Client machines can run the client application as a plug-in for Microsoft Word™ 7.x, although other robust word processors (wp) could be used as well. The client can communicate with the server application via the Open Data Base Connectivity (ODBC) standard. A remote client machine 46 may also communicate with the server via a different protocol such as via Internet connections employing TCP/IP (Transmission Control Protocol over Internet Protocol) 84. The server and client machines can employ the well known Windows operating system, such as Windows 95 or Windows NT, although this is not essential to the invention.

Microsoft Word™ was chosen in one particular embodiment because it is a robust word processor. Robust word processors differ from text editors and rudimentary word processors in that they provide an adequate number of efficiency-enhancing word processing features to the user, with most of them available at any time during authoring of the document. Robust word processors include most, if not all, of the following user features: spelling correction, thesaurus, hierarchical text styles, text search and replace, table formatting, graphics support, automatic section and page numbering, and automatic table of contents generation. Other user features of robust word processors include document compare, footnotes, endnotes, comments, columns, outlining, automatic line numbering, and a highly customizable user interface.

Figure 2:
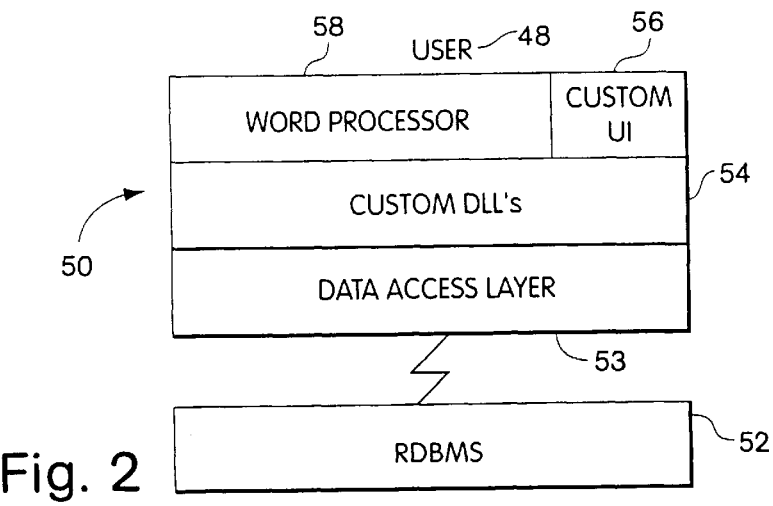
FIG. 2 is a general code architecture diagram showing the relationships between the processes running on the hardware shown in FIG. 1.

Referring to FIG. 2, client processes running on the client machines communicate directly with the SQL server via ODBC. Actions by the user 48 using the word processor 58 trigger calls to custom dynamically linked libraries (DLL's) 54, and these in turn may issue calls via a data access layer 53 to the database 52 to achieve the desired functionality. The user can also interact with a custom user interface process 56 to trigger further calls to the custom libraries.

Figure 3:
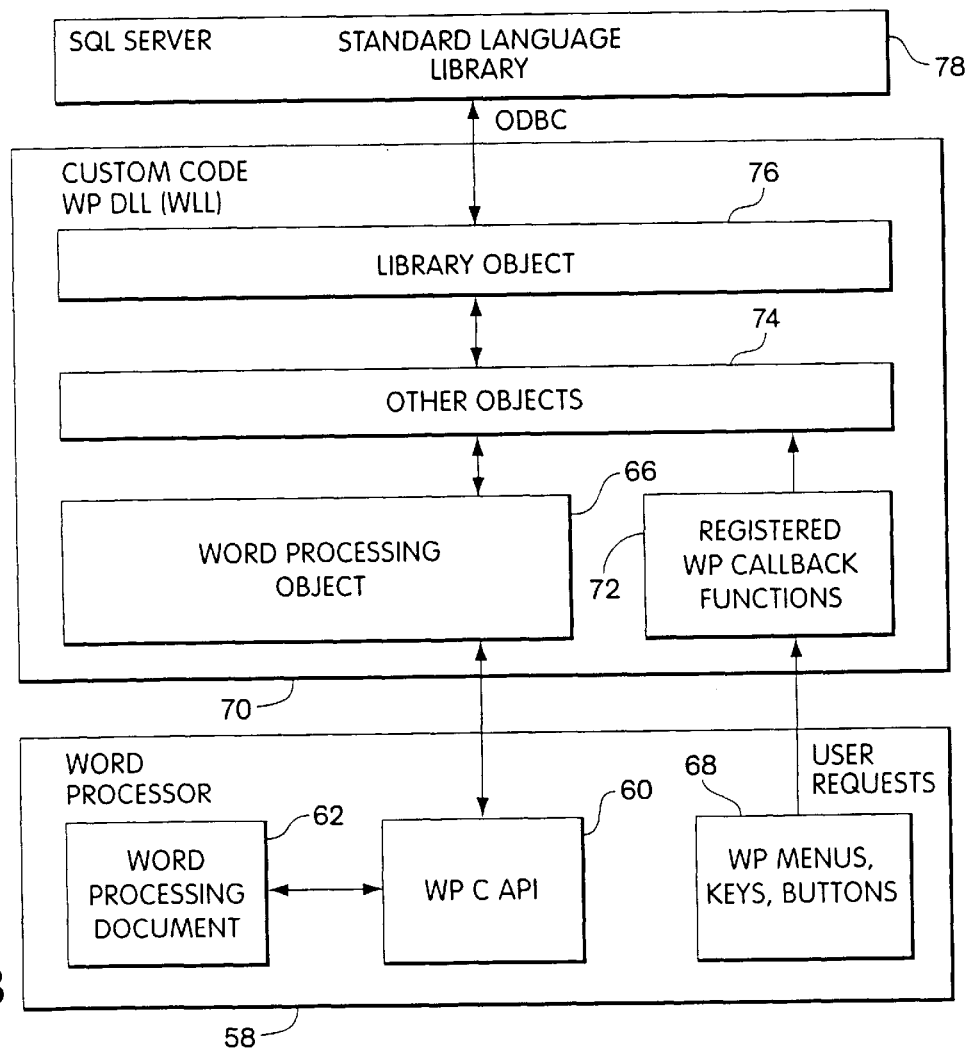
FIG. 3 is a detailed code architecture diagram illustrating the relationship between the word processing, the custom word processing linked library, and the library for the document authoring system of FIG. 1.

Referring to FIG. 3, the word processor 58 includes an Application Programming Interface (API), such as the Microsoft Word™ C API (CAPI). This interface interacts with the document 62 and a word processing object 66 in a custom code word processing DLL (WLL) 70. The word processor 58 also includes an interface for menus, keys, and buttons 68, which provides user requests to registered word processing call back functions 72 within the WLL. Both the word processing object 66 and the registered word processor call back functions interface with other objects 74, which in turn interface with a library object 76. The library object interacts with the library 78 via ODBC.

In the illustrative embodiment, all of the extensions are written in C++ and are loaded into the Word™ run-time environment as Microsoft Word DLL's (WLL's). WLL's represent an efficient and flexible method for customizing a word processor. The custom WLL is installed in the word processing start-up folder on all client machines that access the library. The custom WLL is automatically loaded when the user starts up the word processor.

A typical user interaction begins with a user request, such as a menu choice, button selection, or key combination. The next step is a word processor dispatch, in which the word processor automatically passes the user requests along to the custom function registered to respond to the user event. The third step is custom processing, during which custom code processes the users requests.

There are several types of operations that the custom code may need to perform in order to service the user's requests. The first type of operation is a user interaction. The custom code may need to interact directly with the user or obtain additional information from the user. For example, the login function must get the user name and password from the user. The custom WLL uses Microsoft Foundation Classes to present interface dialogs to the user.

Another type of operation is word processor interaction. The custom code may need to exchange information with the word processor document. For example, the view component boundaries function must change the appearance of the text in the word processing document. The custom code uses a word processing object to interact directly with the word processor API and this object isolates the dependency on the word processing API. This makes the custom code easier to maintain and extend as future versions of the word processing API are released.

Operations further include library interaction. The custom code may need to exchange information with the library. For example, the find component function searches the library for a language component. All library interactions process through the library object. This isolates the dependency on a particular library implementation and makes for an easier transition to other architectures.

In one embodiment, under Windows 95/Microsoft Word™ 7.0 the clients employ 66 MHZ i486 or better processors with 16 MB of RAM, and should have 5 MB of free disk space and an SVGA monitor. For the server a 120 MHZ Pentium or better processor with 32 MB RAM and 2.0 GB disk storage is used. Load testing determines the final requirements of this server. Both the client and server support socket-based communication via TCP/IP and support ODBC.

Figure 4:
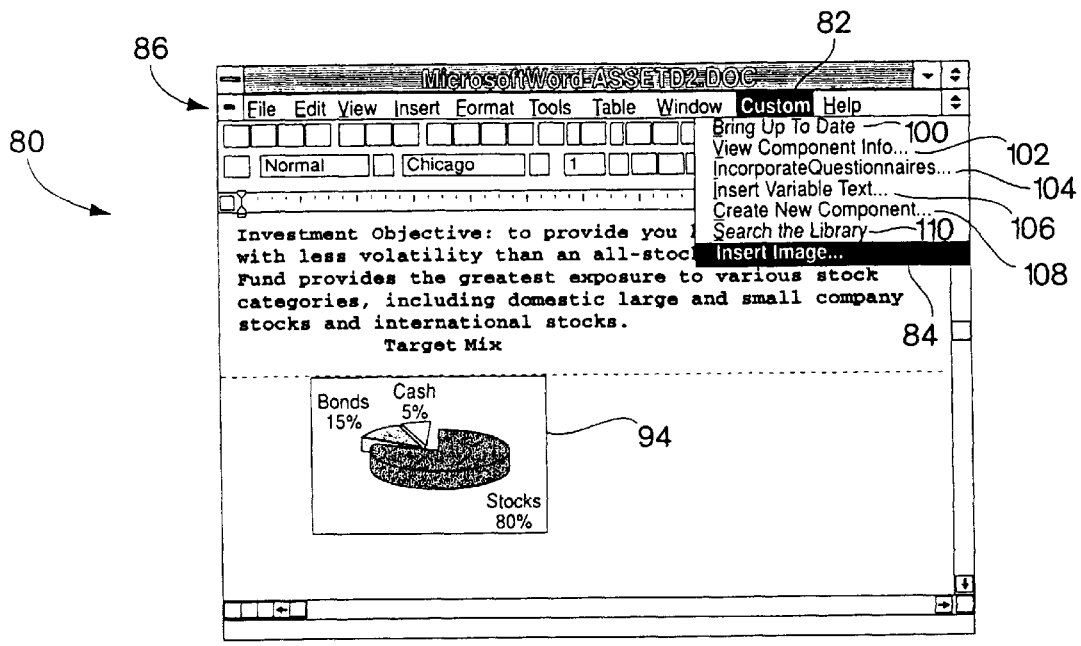
FIG. 4 is a drawing of an illustrative authoring window for use with the authoring system of FIG. 1, showing an exemplary custom menu.

Referring to FIG. 4, building the system as an extension to the familiar Microsoft Word™ environments under Windows allows authors to take advantage of the robust word processing capabilities provided by Microsoft Word™. The user of a client machine opens Microsoft Word™ from Windows and is presented with authoring window 80. Although the word processor's familiar functions are available, this authoring window provides additional functionality. A "custom" item 82 has been added to the menu bar 86, which allows the user to access custom menu items in a custom menu 84. This custom menu provides access to many of the added functions programmed into the system. Some types of items are shown in FIG. 4, and others are described below.

Figure 5:
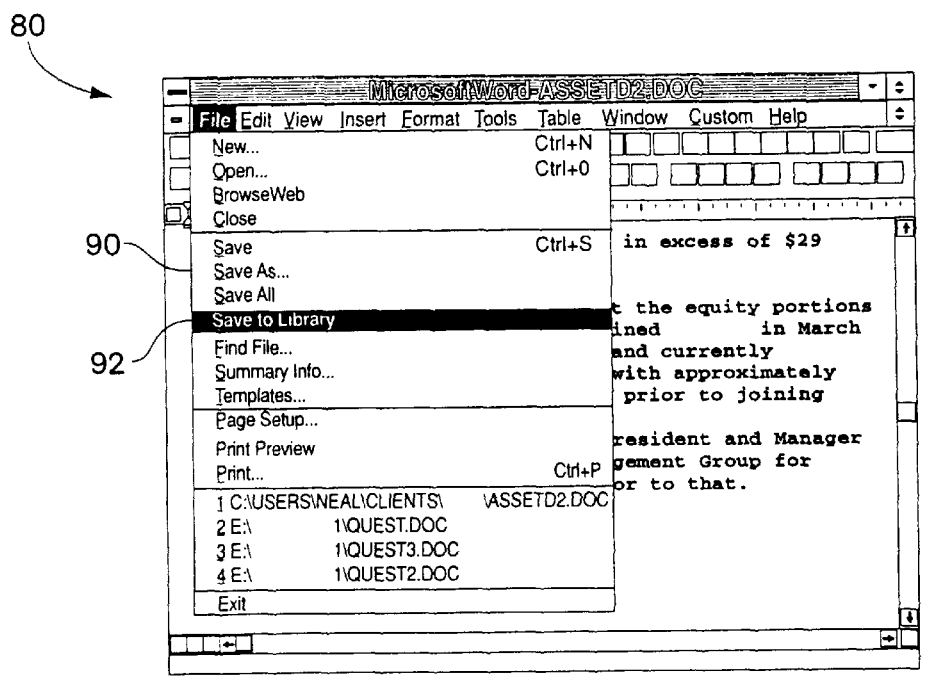
FIG. 5 is a drawing of the illustrative authoring window of FIG. 4, showing a customized file menu.

Referring to FIG. 5, additional functions can be accessed by custom menu items added to standard word processing menus, such as a save to library item 92, which can be accessed from the file menu 90 under the file menu bar item 88. Other menus such as the edit and view menus can also be used to provide access to custom menu items. A comprehensive list of the available functions is presented in the following sections. Note that while reference is made in this list to applications involving financial documents, the system can be used for many other different types of documents, such as legal documents.

Figure 6:
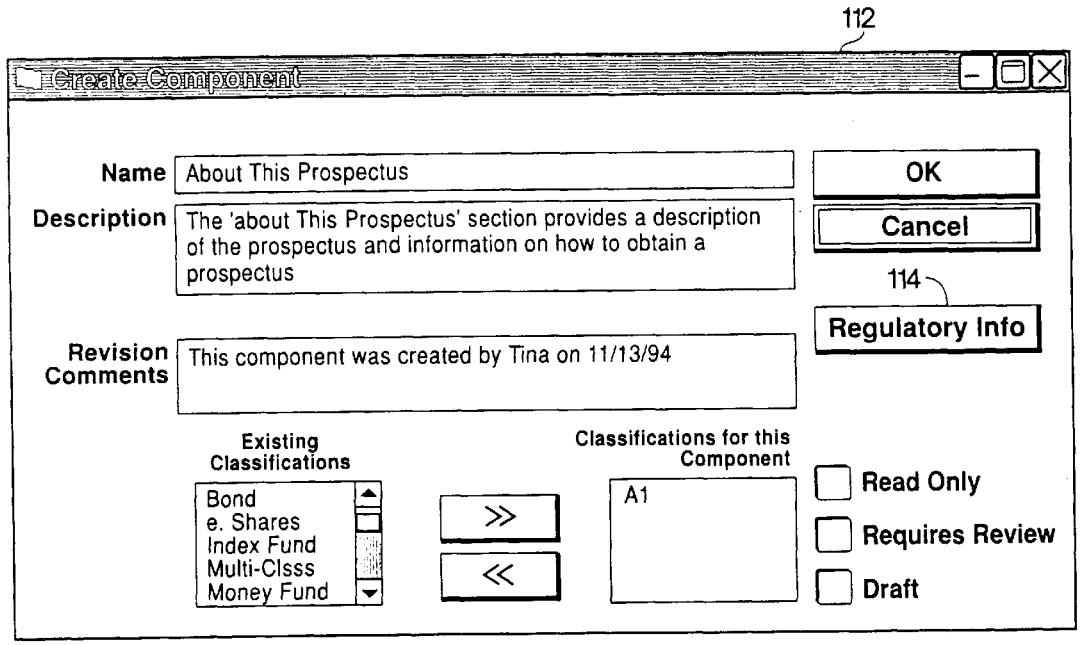
FIG. 6 is a drawing of a create component dialog for use with the authoring system of FIG. 1.

Referring to FIGS. 4–6, a create component function is used to create a new language component. New components are created by selecting the Custom→Create New Component menu option 108. The author tells the system whether the new component is to be inserted above or below the document component that contains the cursor. The author is then prompted to enter text and identifying information for the new component in a create component dialog 112. The user can use the copy and paste features of the word processor to enter the text for the new component. The identifying information can include: name, description, classifications, regulatory information, revision, comments, graphic component, read only, and review required.

The author may then save the component to the library. If the author has not finalized the language in the component, he may choose to save the component as a draft. Note that the component must be saved to the library before the document can be saved to the library.

Figure 7:
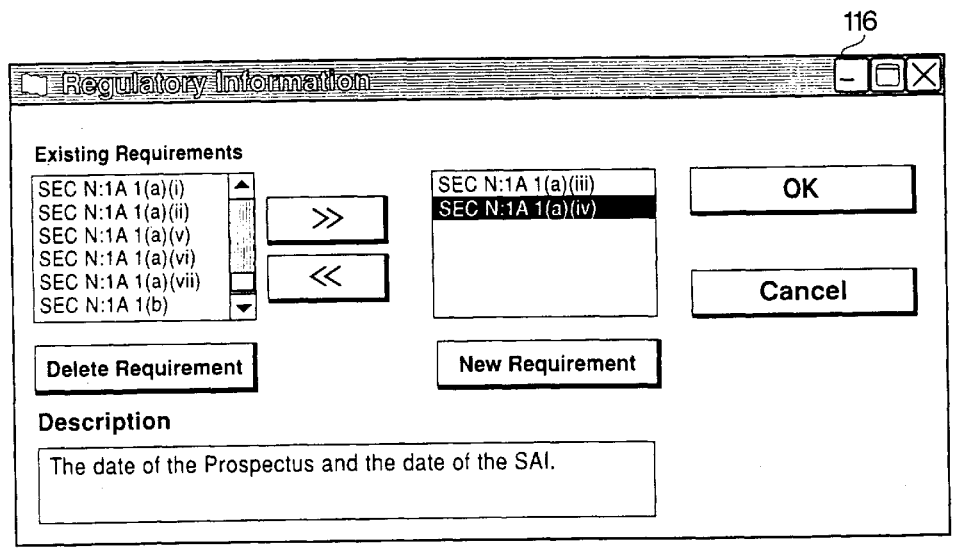
FIG. 7 is a drawing of a regulatory information dialog for use with the authoring system of FIG. 1.

Referring to FIG. 7, when a regulatory info . . . button 114 is pressed in the create component dialog 112, the system displays a regulatory information dialog 116. The author uses this window to associate regulatory requirements with the component.

Figure 8:
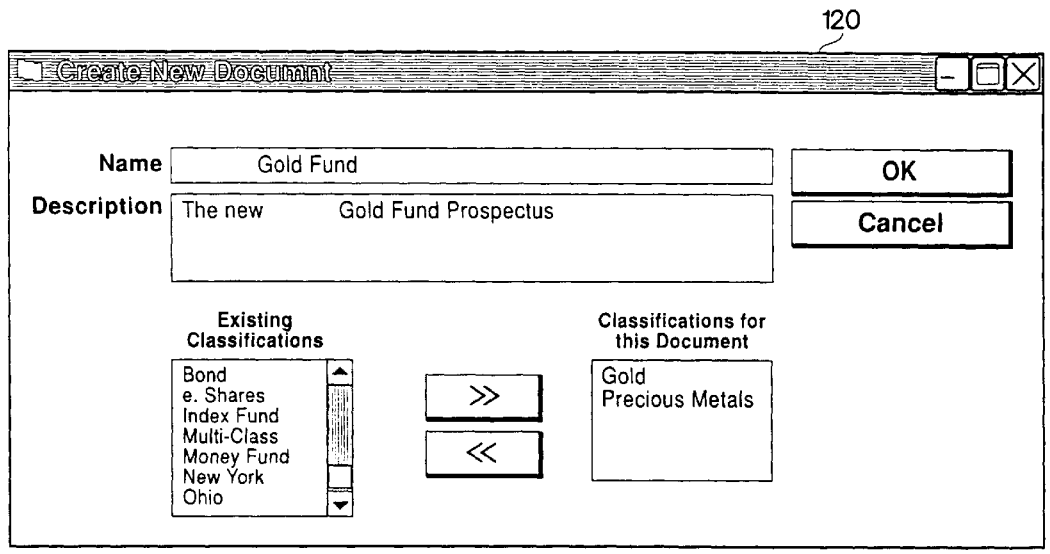
FIG. 8 is a drawing of a create new document dialog for use with the authoring system of FIG. 1.

Referring to FIG. 8, a create new document function is used to add new documents to the library. New documents are created when users are authoring a new document as opposed to revising an existing document. To create a new document the author selects a File→Create New Document . . . menu option. The author is then prompted to enter the identifying information for the document in a create new document dialog 120. The identifying information helps the system track the document and also provides useful information for users searching the library. The document information includes: name, description, and classifications. The system then prompts the author, via the standard save dialog, for a file name to save the new document to disk. Finally, an empty document is opened.

Figure 9:
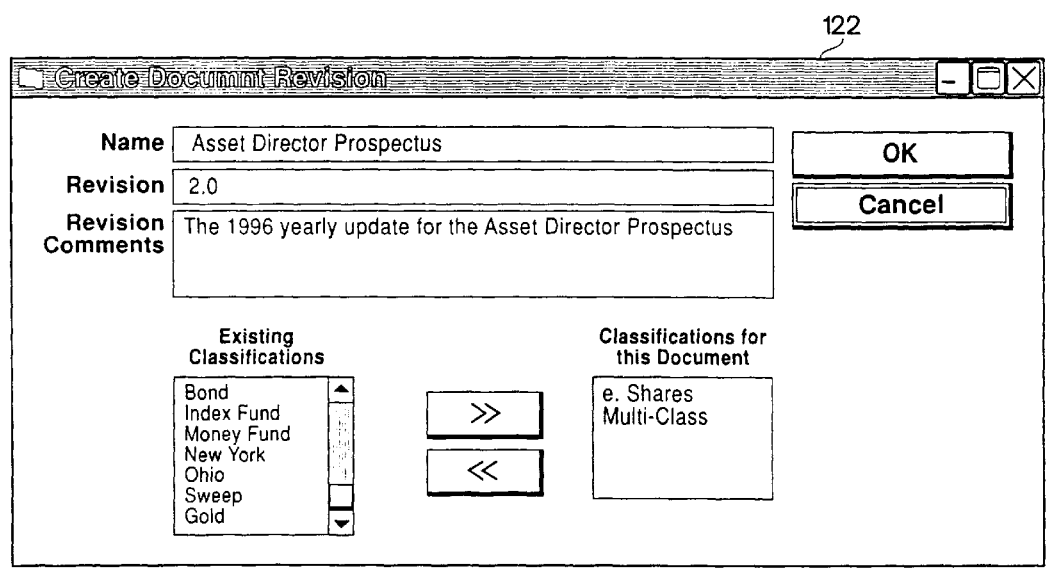
FIG. 9 is a drawing of a create document revision dialog for use with the authoring system of FIG. 1.

Referring to FIG. 9, a create document revision function is used to create a new revision of an existing library document. For example, at least one new revision of a prospectus is generally created each year. There are several steps required to create a new revision of a document. Most of the steps are performed automatically by the system.

Step 1. The author obtains the previous revision of the document. The system need not store the documents in the library.

Step 2. The author opens the previous revision of the document in the word processor.

Step 3. The author selects the File→Create Document Revision . . . menu option, which causes the system to display the create document revision dialog 122.

Step 4. The author has the option of entering a revision comment for the document.

Step 5. The author chooses a new file name for the revised document.

Step 6. The system removes all of the variable text from the document.

Step 7. The system saves the document using the new file name entered by the author in Step 4.

Step 8. The system closes the old revision and opens the new one in the word processor.

Figure 10:
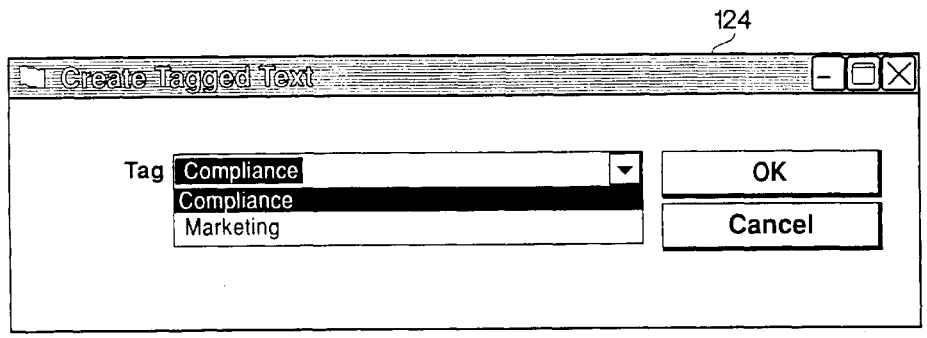
FIG. 10 is a drawing of a create tagged text dialog for use with the authoring system of FIG. 1.

Referring to FIG. 10, a create tagged text function allows a user to tag text in a document using a create tagged text dialog 124. For example, text in the document can be tagged as being "compliance" text. At any point, the author can generate a report listing all compliance text in the document.

The author selects the text that he wished to tag, and then chooses a Custom→Create Tagged Text menu option. The author then chooses the tag that he or she wishes to be associated with the selected text. Existing tags are edited by selecting the tagged tag text and choosing the Create Tag menu option. This will let the user delete or modify the tag.

Figure 11:
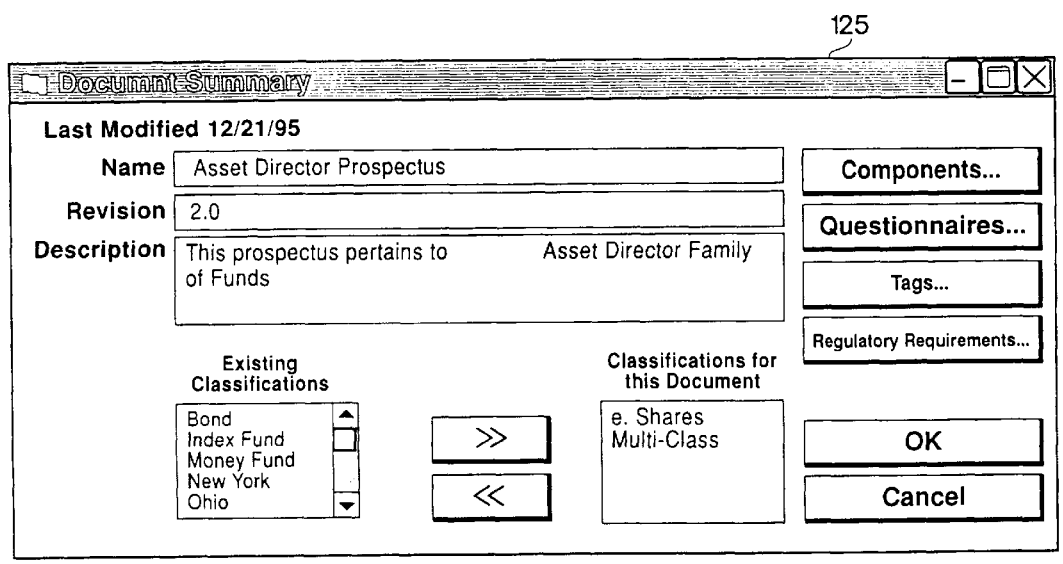
FIG. 11 is a drawing of a document summary dialog for use with the authoring system of FIG. 1.

Referring to FIG. 11, a document summary function is used to provide a high-level description of the document. This function is a useful tool for managing the language components in the library. To view a document summary dialog 125, the author selects a File→Document Summary menu option. The summary provides the following information about the document:

Document information. This includes name, description, revision date, revision name, and classifications.

Components. This includes a listing of all language and image components in the document.

Questionnaires. This includes a list of all questionnaires generated from the document.

Tagged Text. This provides a report describing the tags in the document.

Regulatory Requirements. This provides a report describing the regulatory requirements satisfied by the document.

The author has the option of printing the summary or saving it to disk.

Figure 12:
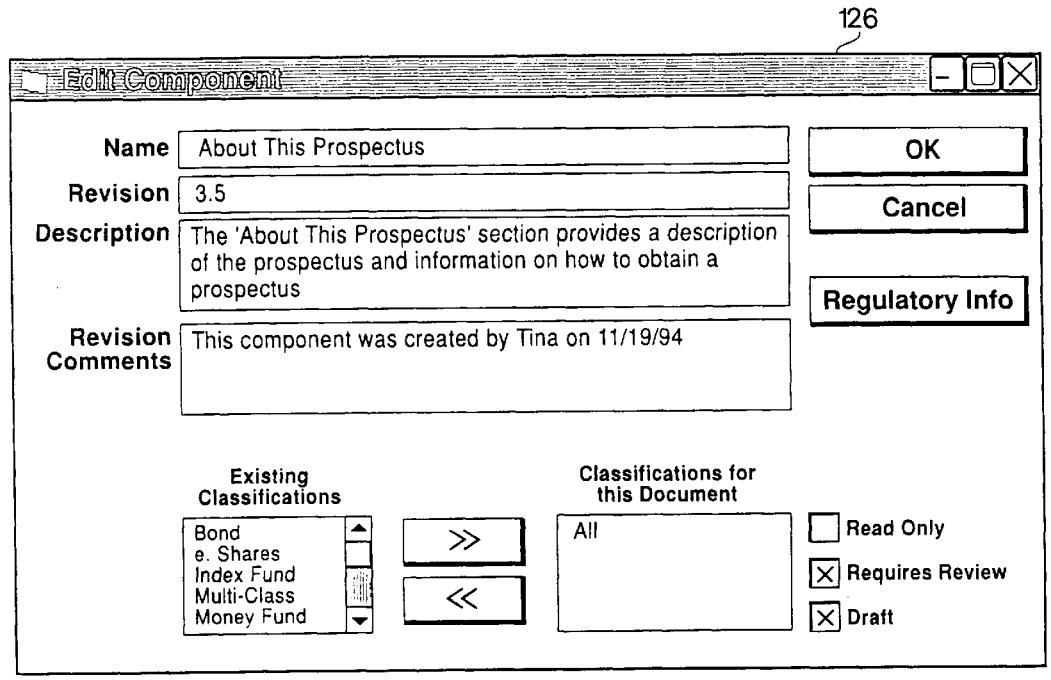
FIG. 12 is a drawing of an edit component dialog for use with the authoring system of FIG. 1.

Referring to FIG. 12, an edit component function is used to modify the information associated with a language component in a document. This function is used to change the component name, description, classifications, regulatory information, read only status, etc.

The author selects an Edit→Edit Component menu option. The system responds by opening an edit component window 126 showing the component information for the language component at the current insertion point. The author may then change any of the information associated with the component. If any component information is changed, the component must be saved to the library before the document can be saved.

Figure 13:
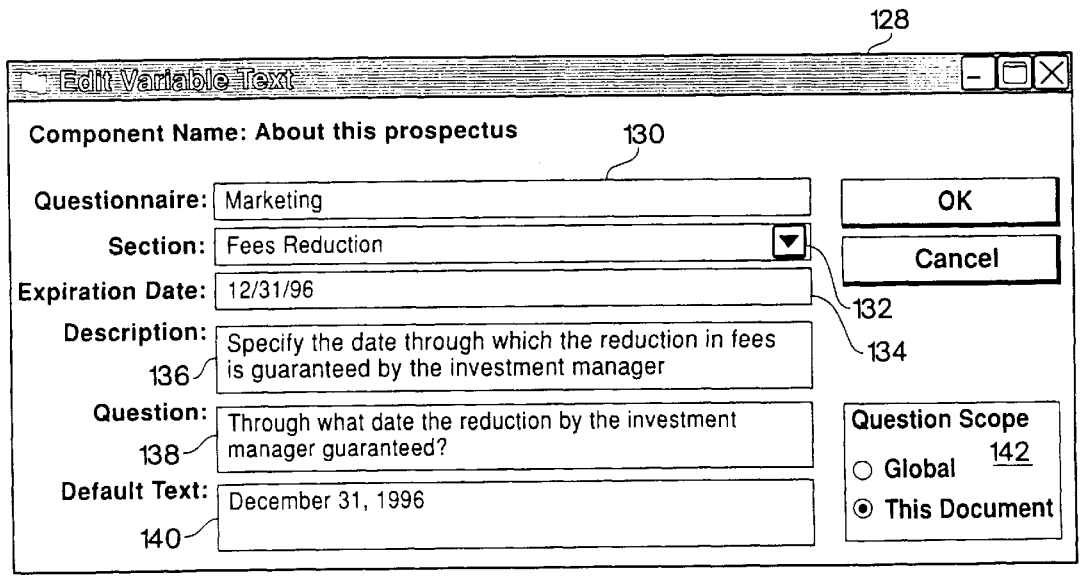
FIG. 13 is a drawing of an edit variable text dialog for use with the authoring system of FIG. 1.

Referring to FIG. 13, an edit variable text function is used to change the variable text in a component. The user selects the variable text in the document, and then selects an Edit→Variable Text menu option. The user is then presented with the same window 128 that he or she can access to through the show questionnaires function. The user can change the variable text using this window. The user enters information for the following fields:

Questionnaire 130. The name of the questionnaire.

Section 132. Questions can be placed in a section in the questionnaire. All questions in a section appear in the same area on the questionnaire form.

Expiration Date 134. The answers to some questions can be valid for a given length of time. If a document is being updated and an answer is out of date, the system forces the user to update the value.

Description 136. This is help text for the person filling out the questionnaire.

Question 138. The question to ask the person filling out the questionnaire.

Default Text 140. This is the default answer for the question.

Question Scope 142. Questions can apply to components within a single document or to all documents in the library (global). For example, a toll-free number belonging to the owner of the system would appear across many prospectuses and it would be useful to only have to enter it once. However, the effective date for a prospectus would apply only to a single prospectus.

Figure 14:
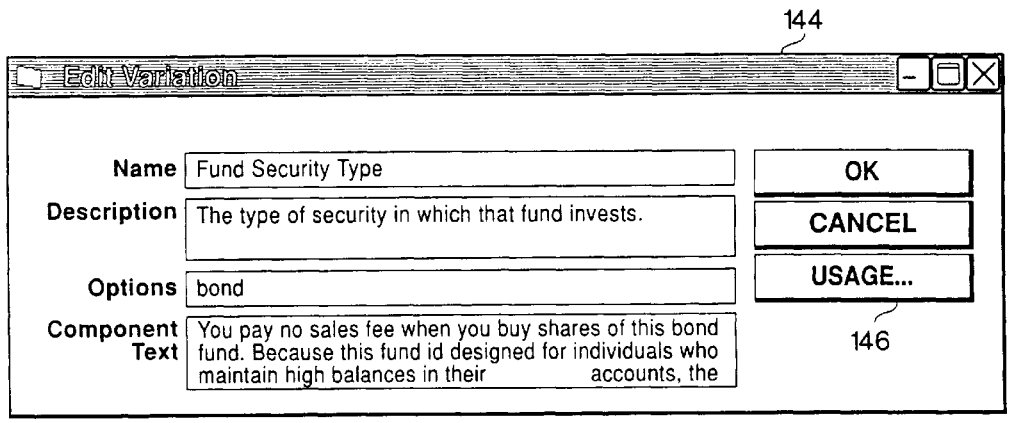
FIG. 14 is a drawing of an edit variation dialog for use with the authoring system of FIG. 1.

Referring to FIG. 14, an edit variation function is used to change the options for a variation in a component. The author selects the variation in the document, and then selects an Edit→Variation menu option. The system then presents the author with an edit variation dialog 144 that provides many of the same options that are available when a variation is being inserted. He or she can change any of the following: name, description, text options. For example, this function could be used to switch from the "stock" text option to the "bond" option for the component The usage button 146 provides information about the other components and documents that use the variation.

Figure 15:
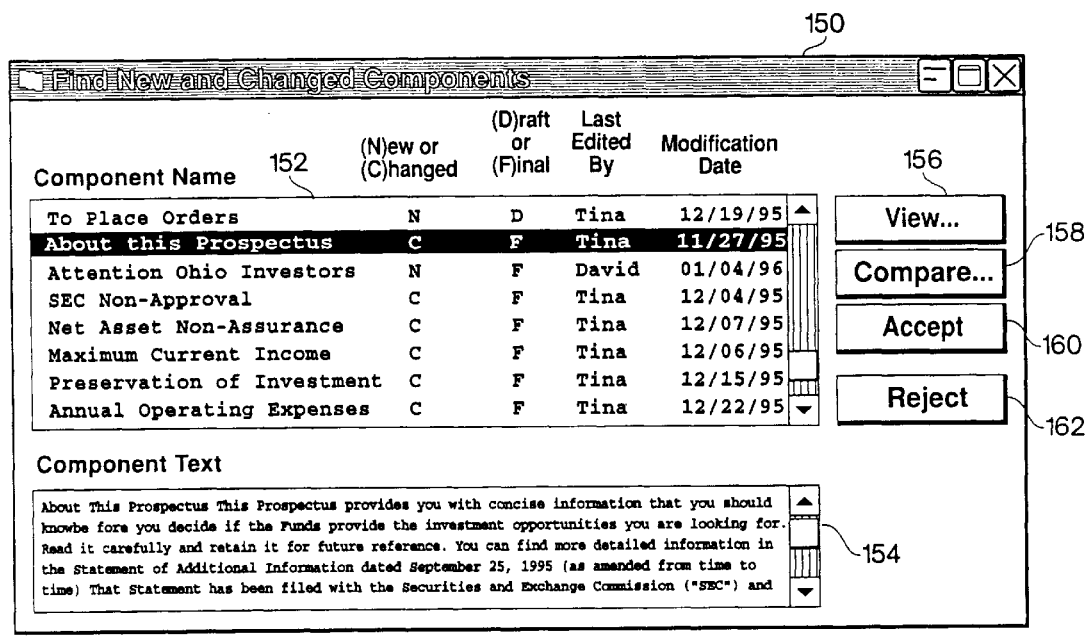
FIG. 15 is a drawing of a find new and changed components dialog for use with the authoring system of FIG. 1.

Referring to FIG. 15, a find new and changed components function finds the language components in the current document that have been revised in the library since the last time the current document was updated. This function also identifies the newly created library components that are of potential interest to the author of the document. All new components that have been classified with any of the same keywords that were used to classify the document are presented. This function enables the author to evaluate the changes in shared language, and update the current document as appropriate.

Changed components are located by selecting an Edit→Find New and Changed Components menu option. The system displays a find new and changed components dialog 150 that lists of all changed and newly created components. Each component is listed by its name, modification date, and author. New components from the library are labeled with an 'N'. Document components that have changed in the library are marked with a 'C'. The system also displays whether the library component is a draft or final component.

When the author selects a component in an upper window 152 of the dialog 150, the new text of the changed component is shown in a lower scrolling window 154 in the dialog. The author has the following options presented by the dialog:

View 156. This button opens the component viewer on the currently selected component. This provides more information about the current component.

Compare 158. This button provides a redline comparison between the library component and the document component.

Accept 160. This button replaces the existing document component with the changed component from the library.

Reject 162. This button rejects the changed component from the library. The document component is left unchanged.

Figures 16, 17:
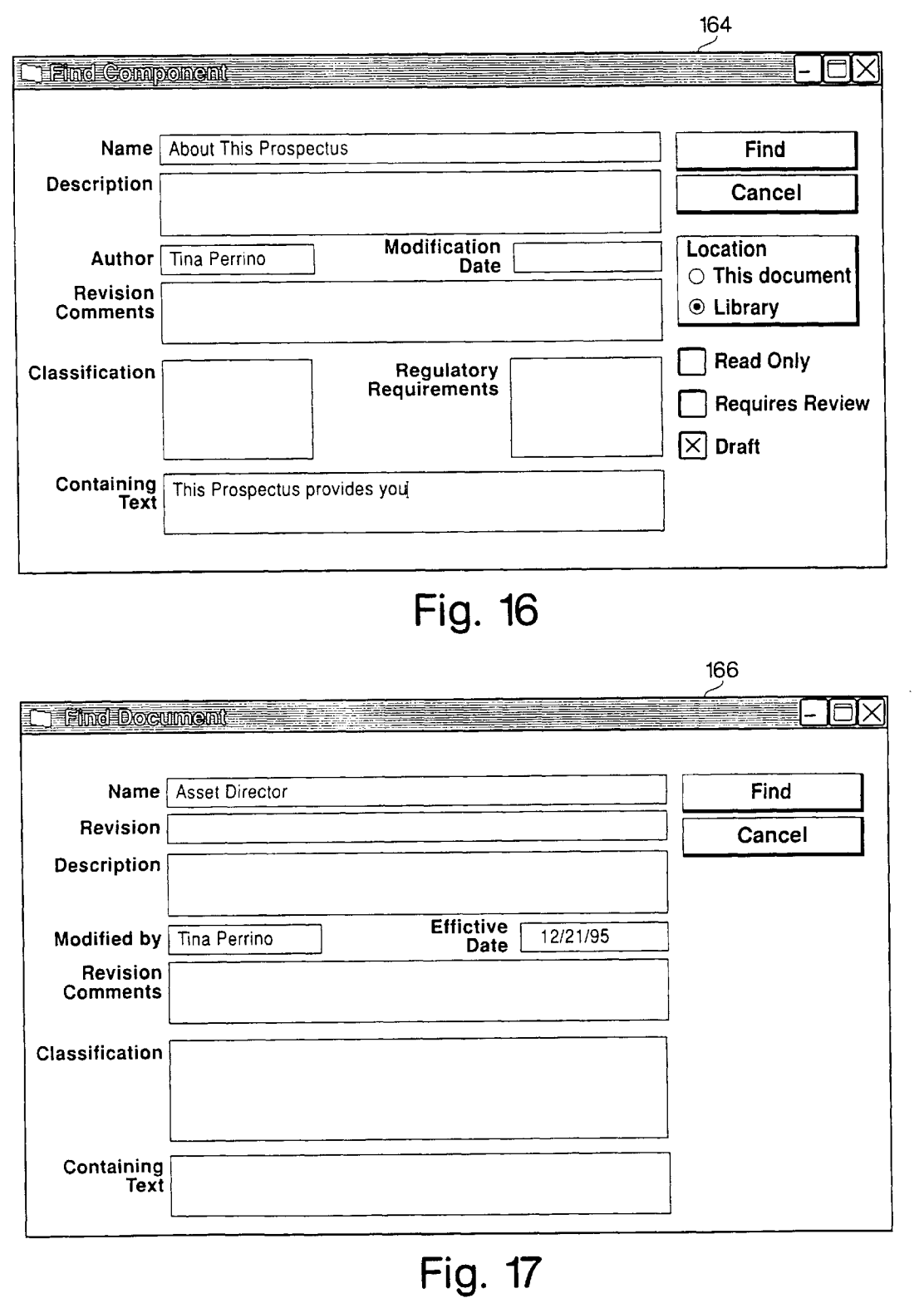

Referring to FIG. 16, a find component function is used to locate language components in the library or in the current document. This function is useful for locating existing language content that may be relevant to the current document. For example, if the author needs to add a section to the current document on the electronic sale of shares, a search for all library components that contain the text "electronic sale" would locate the relevant shared components.

Shared library components are located by selecting an Edit→Find Component . . . menu option, which causes the system to display a find component dialog 164. Components can be located based on any of the following information: name, description, author, classifications, text content, revision, modification date, regulatory information, and location. The system returns a list of all language components in the library that match the search criteria. From the components list, the author has the option of inserting the components into the document or browsing the component.

Referring to FIG. 17, a find document function is used to locate documents in the library. Documents are located by selecting an Edit→Find Document . . . menu item, which causes the system to display a Find Document dialog 166. Documents can be searched based on any of the following information: name, description, modified by, classifications, text content, revision comments, effective date. The system returns a list of all documents in the library that match the search criteria. From the document list, the author has the following options: document info, and edit.

Figure 18:
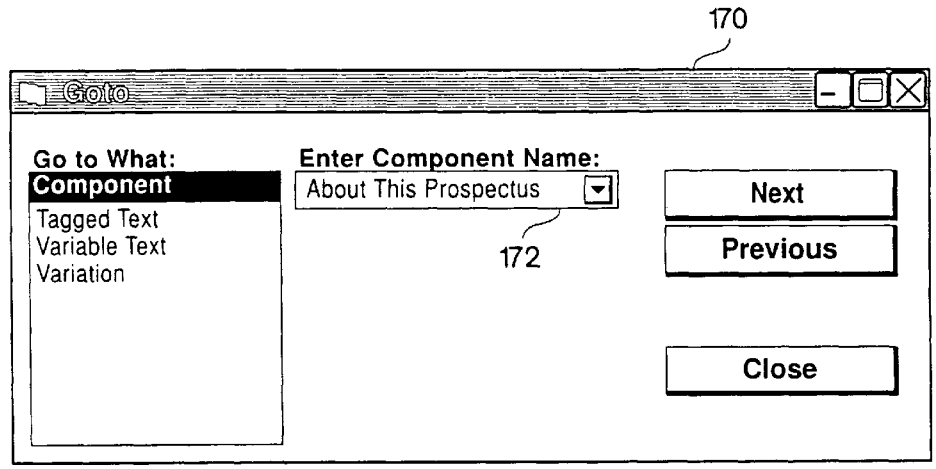
FIG. 18 is a drawing of a go to dialog for use with the authoring system of FIG. 1.

Referring to FIG. 18, a go to function is used to move to the next (or previous) component, variable text, variation, or tagged section in a document. The user selects an Edit→Go To menu option, which causes the system to display a go to dialog 170. The user is then able to select the type of object that they want to locate. The choices are: component, variable text, variation, and tagged text.

When the user wants to go to a component, he or she is able to select the component to move to by choosing the component name from a list 172 containing all components in the document. The system scrolls the document to the next or previous item selected by the user.

Figure 19:
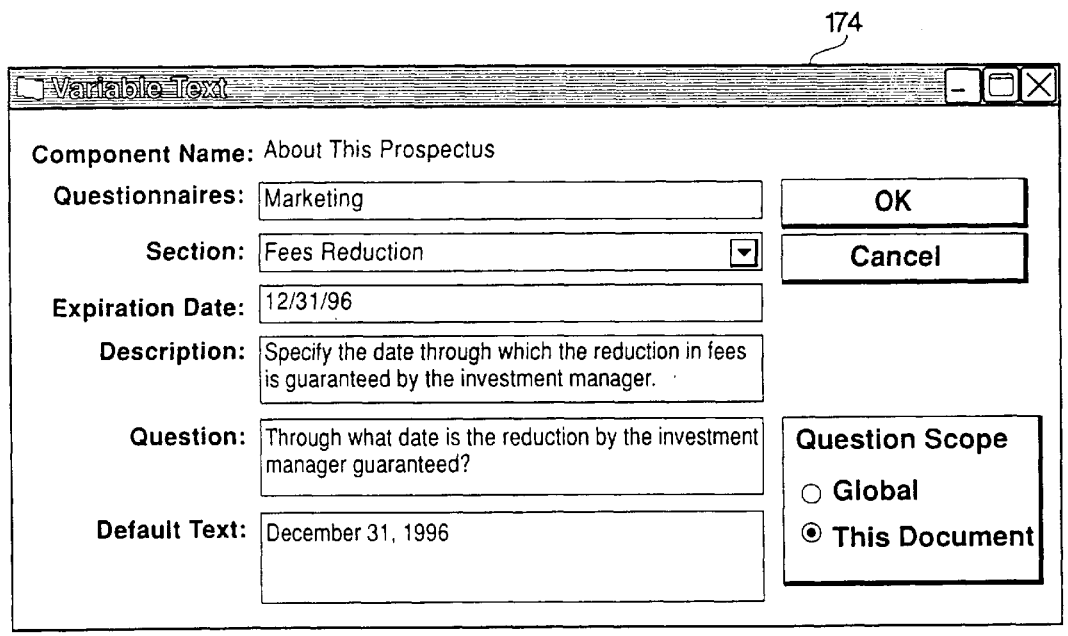
FIG. 19 is a drawing of a variable text dialog for use with the authoring system of FIG. 1.

Referring to FIG. 19, an insert variable text function is used to insert a variable text placeholder in a language component. Variable text is language within a component which varies between document revisions. Examples of variable text include dates, fees, fund names, etc. Variable text is associated with a question in a questionnaire.

The author positions the cursor to the location in the document that is to contain the variable text. The author then selects a Custom→Insert Variable Text menu option. The author must provide the following identifying information for the variable text: questionnaire name, question, description, default value, section, and expiration date. The author must create the appropriate questionnaire before the variable text can be associated with it. The same variable text can exit in more than one location in a document. For example, the fund name can appear as variable text in several places in the document. This is accomplished by entering an existing question in an insert variable text dialog window 174.

Figure 20:
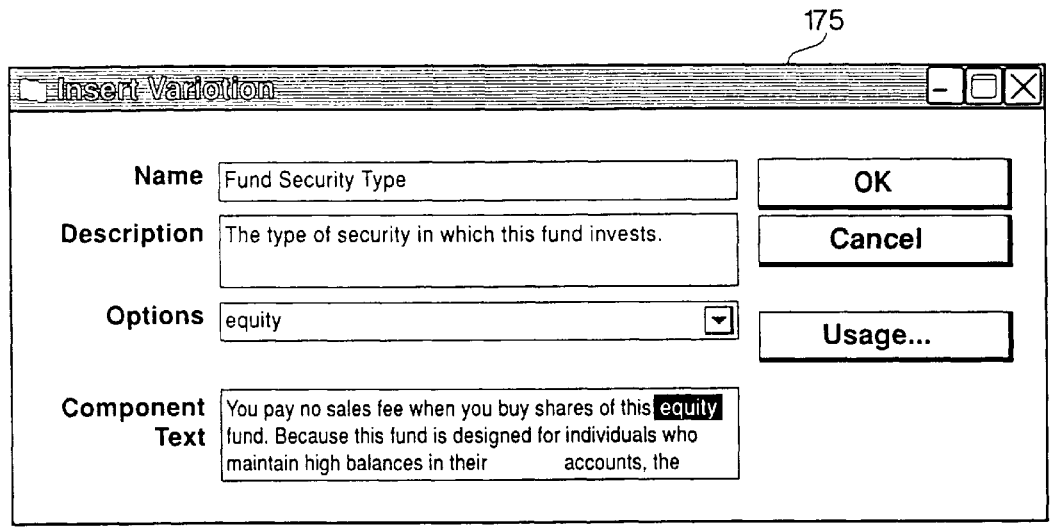
FIG. 20 is a drawing of an insert variation dialog for use with the authoring system of FIG. 1.

Referring to FIG. 20, an insert variation function is used to create variations in the text of components. This gives users the ability to maintain a single component whose text varies slightly depending upon the document in which the component resides. For example, a variation could be used to place the word "equity" or "bond" in a sentence depending upon the document in which the component appears.

The author positions the cursor to the location in the document that is to contain the variable text. The author then selects the Custom→Insert Variation menu option, and the system responds by displaying the insert variation dialog 175. The author must provide the following identifying information for the variation: variation name, text options, description.

The same variation can exist in more than one location in a document. For example, the "stock" or "bond" variation can occur in several places in the document. This is accomplished by entering an existing variation in the insert variation window.

Figure 21:
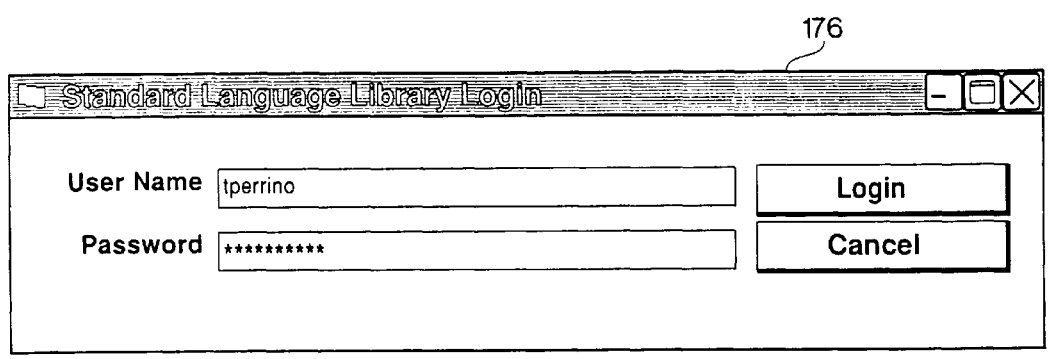
FIG. 21 is a drawing of a login dialog for use with the authoring system of FIG. 1.

Referring to FIG. 21, users must log in with a user name and password before they can use the library. This is to ensure that unauthorized users will not be able to make changes to the contents of the library. Users are always able to make changes to their local copies of the documents without logging in to the system.

Users must log in every time they start up the word processor. Users log in to the library by selecting a File→Login menu option. Once the user enters a valid user name and password into a login dialog 176, the library related menu options are added to the menu bar.

The author can run a compliance report that lists the text in the document that was tagged as being compliance related. The compliance report can be used to help a legal group to ensure that all compliance issues related to the document are satisfied.

A compliance report is run by selecting a Custom→Run Compliance Report menu option. The system creates a new document that contains all text in the document that was tagged as being compliance related and displays it in a compliance report window. The report in this window can be printed or saved to disk.

Users can create any number of tags for text in a document. For example, they could create one tag for compliance text and another for marketing text. The run compliance report feature allows the user to create a report listing all of the text in the document that was associated with any given tag.

The author can also run a regulatory report that lists the regulatory requirements that are satisfied by language components in the document. This function can be used as a final checklist before sending a document out for review. Because of the complex nature of regulatory requirements, it is up to the author to create and maintain an accurate list of the relevant regulatory requirements satisfied by a language component. This function only provides a listing of the regulatory information provided by the author.

Figure 22:
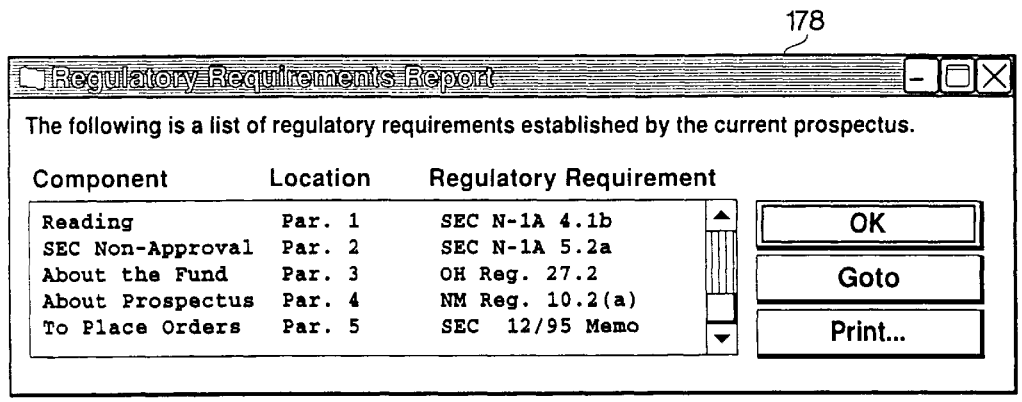
FIG. 22 is a drawing of a regulatory requirements compliance report window for use with the authoring system of FIG. 1.

Referring to FIG. 22, a regulatory report is run by selecting a Custom→Run Regulatory Requirements Report menu option. The system then opens a regulatory requirements report window 178 that contains a listing of all regulations and components that satisfy them. The report in this window can be printed or saved to disk.

A save to library function is used to save the document to the library. Documents should be saved to the library when they are ready for review. A document can only be saved to the library if all of the components in the document have been saved to the library. In addition, all variable text in the document must be updated before the document can be saved to the library. Once the document has been saved to the library, it can be viewed or modified by others.

While the document is being worked on, it can be saved to the user's local disk. The document should only be saved to the library when the author is satisfied that the content in the document is in a final state.

In order to save a document to the library, the author must save all changed document components back to the library. All components that were saved as "draft" must be saved as "final" before the document can be saved to the library. Once all document components have been saved to the library, the File→Save To Library menu option 92 is selected to save the document to the library. The author is prompted to enter revision comments before the document is saved.

Figure 23:
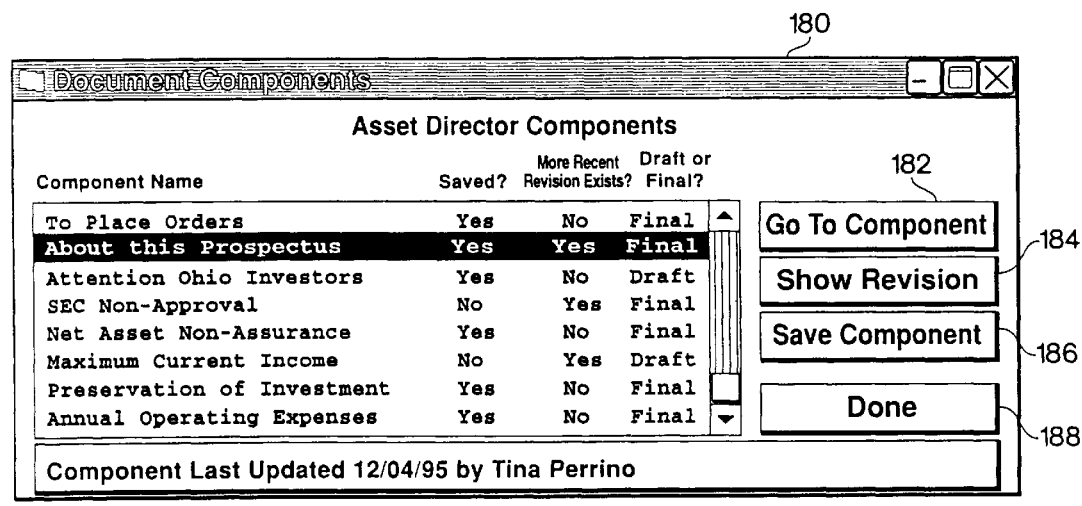
FIG. 23 is a drawing of a show document components window for use with the authoring system of FIG. 1.
Figure 24:
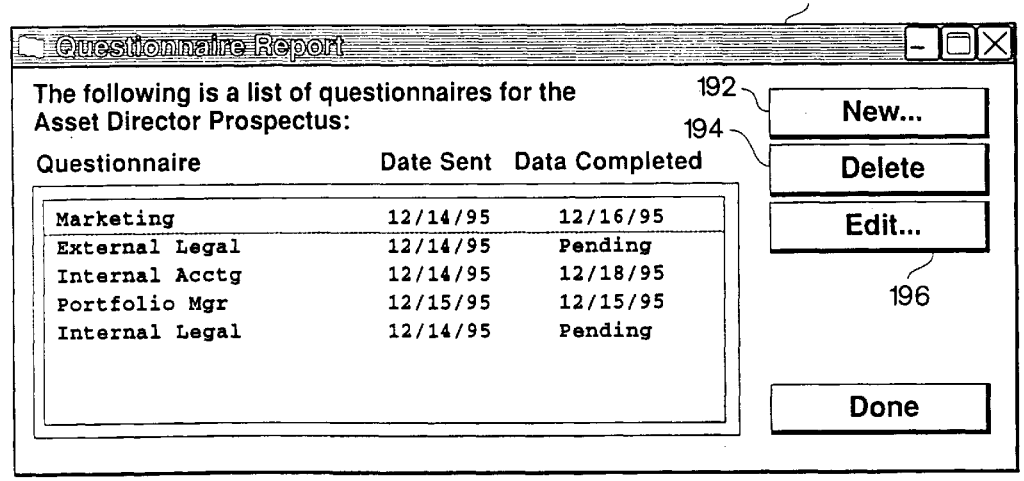
FIG. 24 is a drawing of a show questionnaire report dialog for use with the authoring system of FIG. 1.
Figure 25:
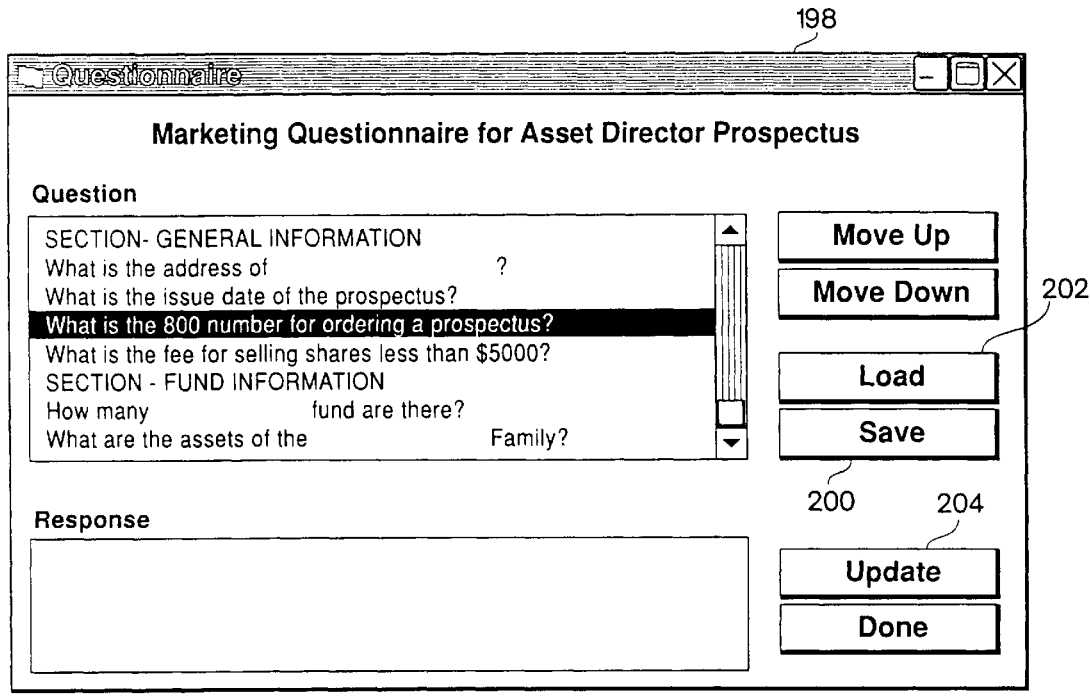
FIG. 25 is a drawing of an edit questionnaire dialog for use with the authoring system of FIG. 1.

Referring to FIG. 23, a show document components function is used to manage the language components in the current document. This function lets users quickly identify the components in the current document that need to be saved to the library. In addition, this function lets users identify those document components that have been changed in other documents since the last time the current document was revised.

To get a listing of all components in the document the author selects a Custom→Show Document Components menu option. The author is presented with a window in a Document Components dialog 180 listing all components in the document. The following information is listed for each component: component name, saved?, more recent revision exists?, draft or final.

The list of document components is initially presented in the order that the components appear in the document. The listing sorted by any of the headings by clicking on that heading in the window. For example, to sort the list by those components that need to saved to the library, the author would click on the "saved to library?" heading in the window.

The document components dialog 180 makes several operations available to the author.

Go To Component 182. This function is used to view the area of the document that contains the component. The document window is scrolled so that the component is in view. The component is also highlighted so that it is clearly visible.

Show Revision 184. This function opens the component viewer for the component. See the section on the component viewer for more information.

Save Component. This function saves the current document component to the library 186. This makes the changed language available to all documents that share the language. The author is prompted for revision comments. These comments help other users to determine whether or not the changed component is appropriate for their document.

Done 188. This function closes the show document components window.

Referring to FIGS. 4, 5, and 24–25, a show questionnaires function is used to manage the questionnaires and associated variable text within a document. The show questionnaires function is available under a Custom→Show Questionnaires menu option. The system opens a show questionnaires dialog 190 that includes a window listing all of the questionnaires available in the document. Each questionnaire is identified by its name, the number of questions, and the date of most recent update.

The show questionnaires dialog makes the following options available:

New 192. This creates a new questionnaire. The author must provide a name, description, due date, and target group for the questionnaire. A new questionnaire must be created before variable text related to the questionnaire can be added to a component.

Delete 194. This function deletes a questionnaire. This function can only be performed if there are no components in the document that contain variable text from the questionnaire.

Edit 196. This function is used to modify a questionnaire. The author can add a new question, delete a question, change the order of the questions, change the section for a question, or change the text associate with a question. In addition, this function is used to change the description, target group, and due date of a questionnaire.

The following functions are available from an edit questionnaire dialog 198 when editing a questionnaire:

Save (Export) 200. This function is used to save a questionnaire to disk as a word processor file. The saved questionnaire can then be given to the target group. The target group fills in the questionnaire using the word processor.

Load (Import) 202. This function is used to load the variable text within a document. The author loads the questionnaire file filled in by the target group. The update button is used to update the variable text elements in the document.

Update 204. This function is used to update the variable text within a document. The author must first load the questionnaire file using the load button. The author can then review and change any of the responses provided by the target group. The system then updates those components in the document that contain variable text related to the questionnaire. The questionnaire can be updated at any time. It is also possible to update the questionnaire more than once if corrections are required.

Figure 26:
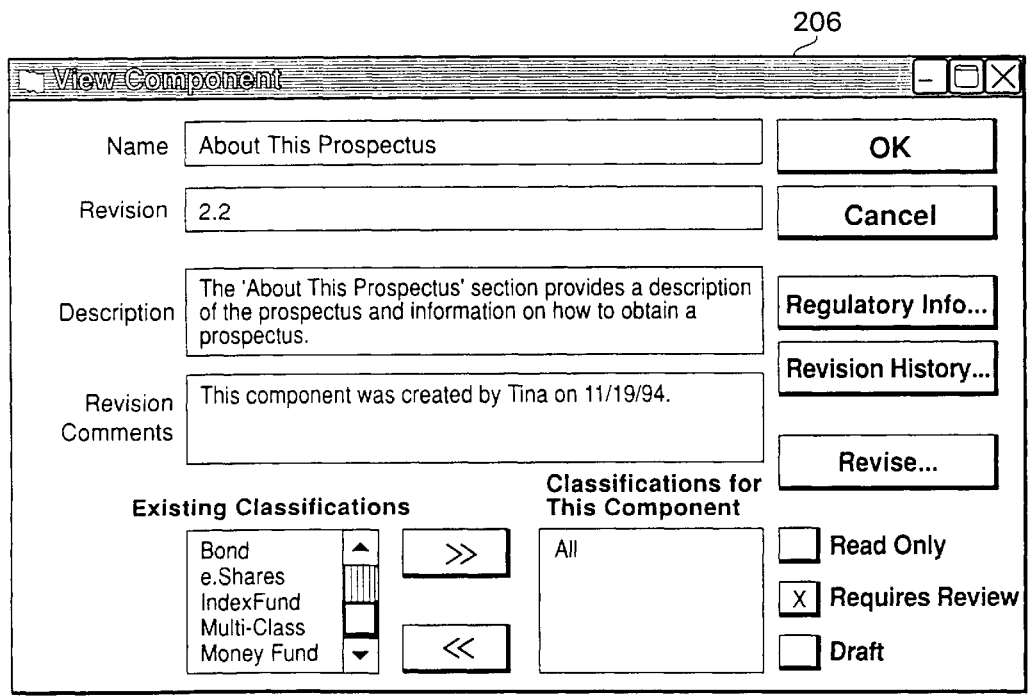
FIG. 26 is a drawing of a view component dialog for use with the authoring system of FIG. 1.

Referring to FIG. 26, a view component function provides more information about a language component. Component information such as name, description, and revision history is displayed. The operations that are available to the author depend on the type of component that is being displayed. For example, different operations are available for components that do not exist in the document than for components that have been modified in the document.

The component viewer is accessible from many areas of the system. For example, the component viewer is available from the show document components window and from the find new components window. The operations that are available depend upon the type of component. There are four types of components: document components that are current, modified document components, library components not in the document, and shared library components that have changed.

FIG. 26 shows an example of the view component window 206 displayed for an existing document component that is current. The following operations can be performed on document components that are current: regulatory info, revision history, and revise. The following operations can be performed on components that have been modified in the document: edit, redline, save to library, revert to saved, goto, and show component usage. The following operations can be performed on components that exist in the library but are not in the document: insert, browse revisions, and show component usage. The following operations can be performed on components that have been changed in the library since the last time the document was revised: accept, reject, redline, browse revisions, goto, and show component usage.

The system also provides a view component boundaries function that is used to display the component boundaries on the screen. This function is very useful when the user is working with the library. For example, it is useful to view the component boundaries when inserting text so that it is possible to determine the component that is being modified.

The view component boundaries function is available from a View→Component Boundaries menu option. In addition to component boundaries, the user can choose to show any of the following: variable text, variations, tagged text (compliance text), and regulatory information. The different items can be displayed in different ways.

Figure 27:
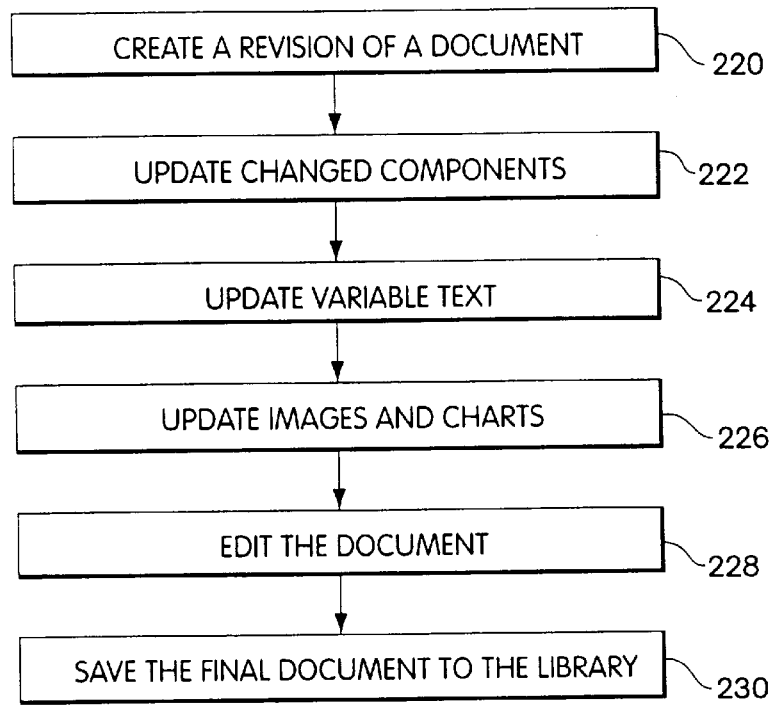
FIG. 27 is a flowchart showing steps taken in an illustrative document revision task using the system of FIG. 1.

Referring to FIG. 27, operation of the authoring system 10 will now be described in connection with an illustrative task of revising an existing document using the library. There are several groups of functions that users will employ when revising a document. The following description breaks out the functions in roughly the order that they would be executed when revising a document. The author first creates a revision of a document (step 220). The author next updates changed components (step 222), variable text (step 224), and images and charts (step 226). The author can then edit the document (step 228), and finishes by saving the final document to the library (step 230).

Referring to FIGS. 27 and 9, the first step in revising a document (step 220) is to create a revision of an existing document. Document revisions are created when an author wants to create a new version of a document already in the library. For example, revisions of a prospectus are created on at least a yearly basis. The create new document function described above can be used to create and add new documents to the library.

There are several steps required to create a revision of a document. Most of the steps are performed automatically by the system. First, the author opens the previous revision of the document in the word processor. The author then selects the File→Create Revision . . . menu option, and the system opens the document revision in a new window. All variable text is automatically reset to the appropriate default value. Finally, the system closes the window containing the previous revision of the document.

Referring to FIGS. 15 and 26–27, once a new document revision has been created, the next step is to update all of the changed language components from the library. This step gives the author the opportunity to use the most up-to-date language components available. The author initiates the component update process by selecting the Custom→Find New and Changed Components menu option. The author is then presented with the find new and changed components dialog 150.

This dialog window shows all relevant components that have been changed or created since the last time this document was revised. The components are listed in the order that they appear in the document. The author can change the order in which the components are listed. The components can be listed by name or modification date. When the author selects a component in the upper pane 152, the text of the new or revised component is shown in the bottom pane 154. In addition, the document window is scrolled so that the existing document component is shown and highlighted.

All components in the document that have been modified since the last time the document was revised are listed. New components that have been added to related documents are also presented to the author. For example, suppose that David is revising a bond prospectus. Earlier in the year, Tina had added a new language component to her bond prospectuses. David would be notified at this stage that a new bond component is available.

The system provides several functions that help the author to decide whether or not to include the changed components in the new revision. A view . . . button 156 opens the view component dialog window 206 that provides more information about the revised component. The window shows the name, description, and revision comments for the component. It is possible to view the regulatory information for the component. It is also possible to revise the text of the component. Finally, it is possible to view previous revisions of the component from this window.

A compare . . . button 158 provides a redline comparison between the revised component in the library and the existing component in the document. The comparison is performed in a new window in which added text is shown underlined and deleted text is shown struck out. An accept button 160 replaces the existing document component with the revised component from the library. If the author chooses to accept to a new component, the text of the component is inserted into the document. A reject button 162 leaves the existing document component unchanged. This should be used if the author does not wish to use the new language from the library.

Variable text can be updated next. Variable text is language within a component which varies between document revisions. Examples of variable text include dates, fees, fund names, etc. Variable text is associated with a question in a questionnaire. A document can contain any number of questionnaires. Each questionnaire contains a set of questions that are meant to be provided by a single external group. For example, a document could contain a questionnaire that is to be filled out by the financial accounting group. Once financial accounting fills out the questionnaire, the document can be updated to contain the appropriate accounting numbers. This system allows legal to easily keep track of the information in the document that needs to be updated.

By setting aside slots for variable text within components and then filling out questionnaires for each prospectus, the appropriate text is placed correctly within the prospectus. The system provides methods for inserting variable text into a component, viewing questionnaires, and updating the variable text within a prospectus by filling out a questionnaire.

Referring to FIG. 4, because images, charts and tables are not directly managed by the library, a dummy component is inserted in the library as a placeholder for the image, chart or table. This dummy component does not contain the graphic or table itself, but can contain information about it and comments entered by the author. These dummy components are used to ensure that information like charts and graphs are updated when the document is revised. As shown in FIG. 4, the graphic 94 appears in the document.

The author can then edit the document. He or she can perform routine editing, edit existing components, or create new components. For routine editing, the author will be working within the standard features of the word processor. It is only when the author saves the document to the library or initiates some other library related function that he or she is presented with custom word processor functionality and dialog boxes. If desired the author may turn on the View→Component Boundaries mode which demarcates different components in the text by sharing them differently.

Referring to FIG. 12, to change a component, the author selects the Custom→Edit Component option and is presented with an edit component dialog 126 that allows him or her to change information related to the component. This allows the author to change component information such as regulatory requirements related to a component.

Referring to FIG. 6, to create a new component, the author selects an area of text and then selects Custom→Create New Component menu option 108. The user then fills out any necessary information about the component using the new component dialog and saves the component to the library.

Referring to FIG. 5, when the author is done editing a particular version of the prospectus, he will save the document to the library. This involves several steps. First, the author chooses the File→Save to Library . . . option 92. The system then presents the author with a dialog which lists the components in the document which are new components or modified versions of existing components.

Before the document can be saved to the library, components in the document that have been modified in any way must be saved to the library as final components. The document can not be saved to the library if it contains any components that are saved in the library as draft components.

Figure 28:
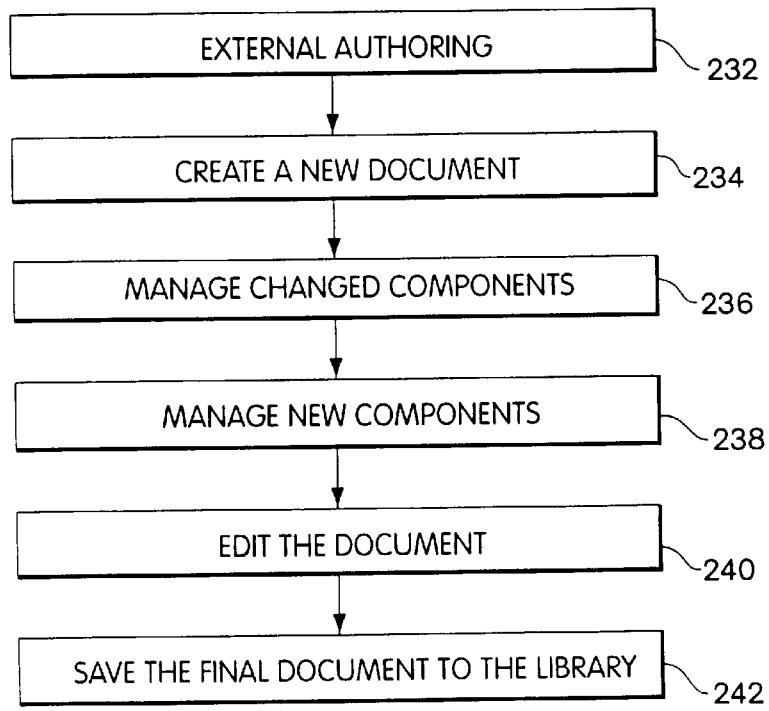
FIG. 28 is a flowchart showing steps taken in an illustrative document creation task using the system of FIG. 1.
Figure 29:
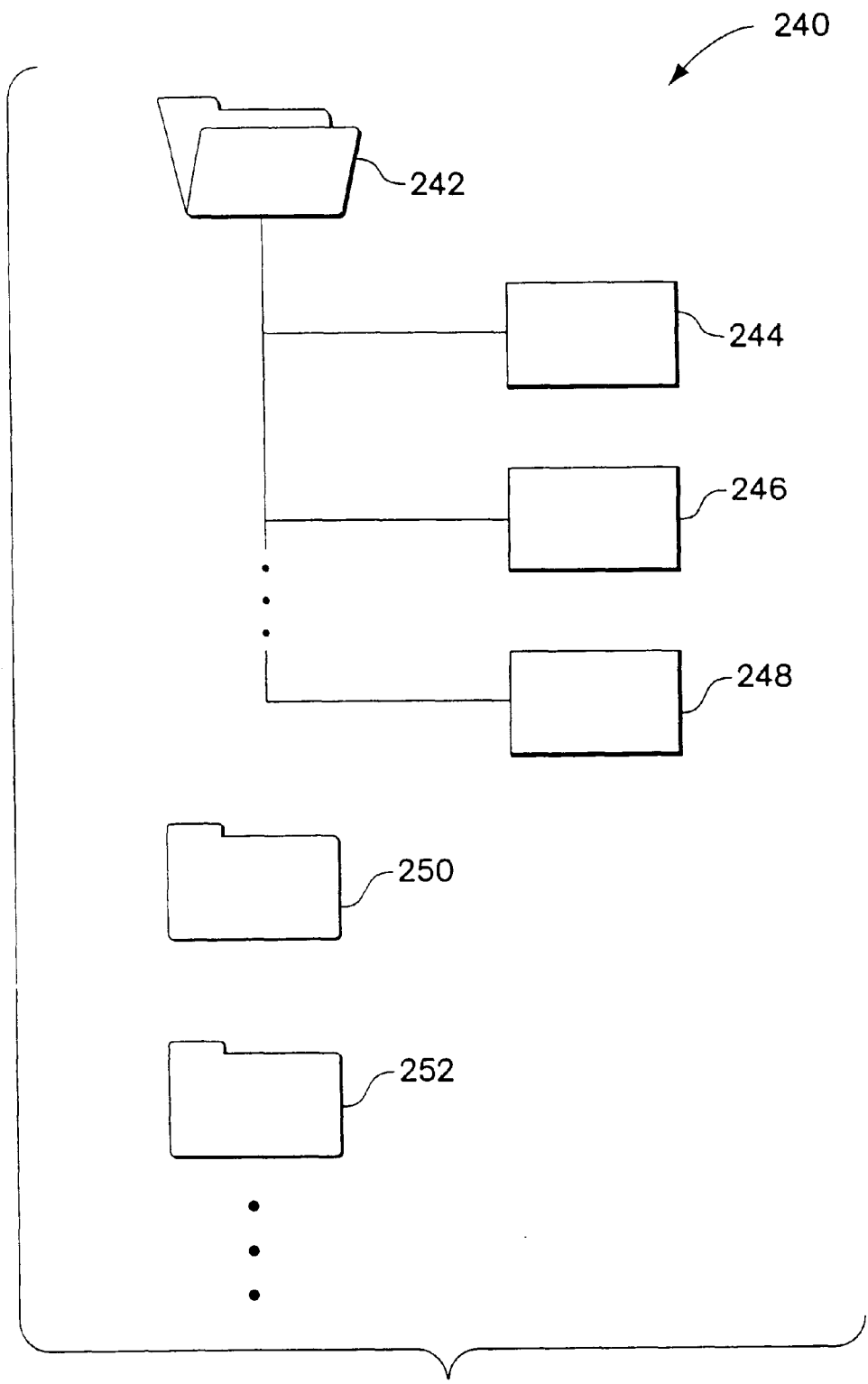
FIG. 29 is a drawing illustrating a tree viewer interface window for the system of FIG. 1.

Referring to FIG. 28, operation of the authoring system 10 will now be further described in connection with an illustrative task of creating a new document using the library. The task begins with external authoring (step 232), and a new document is then created (step 234). The author can then manage changed components (step 236), and manage new components (step 238). The author next edits the document (step 240), and saves the final document to the library (step 242). The last two steps are similar to the corresponding steps described above in connection with document revisions and are therefore not described again. In order to provide a clear and concise description of the document creation process, others of the earlier-described functions that the author may perform are also not discussed again.

New documents are often created by groups outside of a legal department, and are then imported into the system, and the following illustrative sequence describes the steps performed by external departments as well as those performed internally by the legal department. In the case of a prospectus, for example, the documents can be authored by the marketing group with the word processor. There are several methods used to create the language for the new prospectus. The content for the new document can be copied from existing electronic prospectuses, obtained from the library, or copied from externally printed prospectuses.

If the author copies the content for the new document from an existing library document, the system will attempt to maintain the component information associated with the copied text. This may not always be possible as the author may not grab the complete text of the component. If a complete component is copied into a document, the system will automatically recognize the component as an existing library component. When copying content from a non-library document, the system treats the new text as if it had been typed in by the author.

The author can also search the library to obtain language. The search can be based upon component name, classifications, text, revision information, author, and regulatory requirements. The author can also choose to search for those components saved as drafts.

Referring to FIG. 16, the author searches for components by choosing the Edit→Find Component menu option, which displays a find component dialog 164. After filling out the appropriate slots in the query, the author is returned a list of components from the library which match the criteria. The author may then view any appropriate components and paste them into the document, if desired.

The author can obtain language from external documents as well. For example, the marketing group may use a competitor's prospectus as a prototype for the language required for a new prospectus. In this case, the system will treat the text as a new component which must be saved to the library.

Eventually the new document is provided to the legal department, whose members must incorporate the language from the document into the library. The first step in this process is to notify the system that a new document has been created. In order to create a new document, the author must provide the system with information about the document. This information includes the name of the document, a description of the document, classifications that classify the document, etc.

Referring to FIG. 26, the next step is for the author to identify the language components in the document that have been modified. The function Custom→Show Document Components provides a document components dialog that includes a list of all of the document components that have been modified.

There are several options available for each changed component. If the change is deemed acceptable, the author can save the changed component to the library. If the change is not deemed acceptable, the author can revert the changed component back to the language used in the existing library version of the component. In some cases, the author may want to break the changed component apart. Typically, the author will retain one piece that is an existing library component, and add a new library component that represents the beginning or end of a component that was marked as being modified.

When a new document is created, some language may be added that is not part of an existing library component. The system will attempt to identify this language in the document. The author must evaluate the new language and add it to the library if appropriate.

The authoring system provides tools that enable the use of standardized language within documents. The user is responsible for using the tools provided to ensure that language is used consistently throughout the documents that are produced. The following passage provides some recommendations for maintaining the language in the library.

When creating a new language component, a user should first search the library to see if there is an existing language component that is appropriate. A user should use generic language whenever possible. This will make it easier to re-use language.

If small sections of text are to be changed, a user should use variable text instead of creating a new components. This will reduce the number of components and make the library easier to manage. A periodic review and consolidation of components should also be performed to ensure that language is being used consistently in the library.

Functions can assist in maintaining the library. These include a library browser, a classification maintenance tool, and a report generator. The library browser allows the user to view components by their name, date last revised, author, regulatory requirements, comments, and classification. This can aid users in eliminating duplicate language and consolidating library components. Any view that the browser displays may be printed out. The library browser will also let users create or modify library components.

A classification maintenance tool is also provided. Documents and components are categorized based on a set of pre-defined classifications. The classifications are used as a search aid. Classifications are also used to automatically notify users of new components. When users create new components, they are given the choice of selecting the categories to use to classify the component. The user is given the option of choosing from a list of pre-defined classifications; the user can not create new categories.

The list of available categories should be updated periodically after review by a library maintenance committee. This tool lets the administrators maintain the list of available categories. They can add and delete categories using the classification maintenance tool.

The system can also generate reports, which will provide the user with different views of the library data: a list of components by regulatory requirement satisfied; a list of components by author; a list of components by data modified; a list of components by classification; a list of components contained in each document; and a list of documents in the library.

Referring again to FIG. 1, the client application may consist of one or more DLL's which allow Microsoft Word™ to access the functionality of the application. An appropriate ODBC driver will also be necessary to facilitate communication with the database. Client installation consists of copying the aforementioned files to the user's machine. These may be installed locally from an installation disk or from a shared drive accessible via the network.

The server installation can involve the following steps: installation of the database application (if necessary); starting the database (if necessary); creating a table space for use with the application; loading the library information into the tablespace; and making the database available to the client application.

Updates for the client can be provided as scripts to be run on the client machine. These updates will replace application files with updated versions in order to provide the user with up-to-date functionality.

Server updates may require modifications to the database structure or to data stored in the database. These can be provided as scripts to be run against the database to make the necessary changes.

The system can support the ability to have a development and production system so that any changes to be made can be verified on the development system before deployment to a production environment. This will minimize any transitional issues and allow the technical staff to validate the updated system.

The system may also provide tools that allow administrators to backup and restore the language library. The system will support the backup and restore of documents and components.

The authoring system should support ease of migration to future phases of document automation. A first phase consists of the creation of a library without document management or publishing features. To extend the system it is possible to manage the documents created with the library in an existing document management system (DMS). Although documents will not be maintained by the system in the first phase, documents will be kept in a logical directory structure to ease transition to storage in the DMS. Component and document data will be stored in a standard SQL database, to minimize the effort when integrating with the document management system.

The following design goals were established in developing an authoring system according to the invention. One goal was ease of Use. The design should support a system that is easy for the end user. The design should make the separation between the custom code and the word processor as seamless as possible. The design should also support remote users editing documents without having direct access to the library server.

Robustness, efficiency, and maintainability were additional goals. The design should robustly support the features described in the functional specification. The design should be as efficient as possible. For example, the system should minimize the amount of data that must be transmitted between the client and the library. The solution should be designed to that it is possible for staff to easily maintain the system.

Extendibility and scalability were also goals. It should be possible for developers to easily extend the system to support evolving user needs. It should also be possible for the architecture to scale to meet anticipated growth. The solution should fit within systems' environment as well. This includes preferred hardware, software, and development environments.

The design goals also included ease of implementation and ease of migration. It should be possible to implement the design using standard tools and techniques. The system should also be designed so that it is relatively easy to migrate to a system based on a traditional document management system. Furthermore, the design should not impose any unnecessary development, deployment, or maintenance costs.

An illustrative authoring system according to the invention has been described in detail along with a listing of design goals. One of ordinary skill will be able to implement a system in accordance with the invention from this description and the following general remarks.

Managing change in documents is a critical business process which requires accuracy and timeliness. Changes must be recorded, reviewed, and incorporated not just on a document level, but on a sub-document level so language may be reused most efficiently. Authoring systems according to the invention solve the problem of managing subdocument level content in a novel fashion.

The authoring system manages the language revision process by breaking up documents into modular, reusable pieces called components. These components may, in turn, contain other modular, reusable pieces of language in order to provide maximum flexibility. These language components and sub-components are stored in a client/server database so each user may be made aware of changes which other users of the system have made.

As discussed above, users can interact with the authoring system via a Microsoft Word™ interface, and the system is run as a plug-in to the Microsoft Word™ application. Management of document components and sub-components is realized by storing database key information within Microsoft Word™ bookmarks. This allows the user to exchange information between the document and the database and other library users. The storage of key information within the bookmarks also allows for comparison of local language components with those that reside in the database.

The authoring system uses the extended Microsoft Word™ environment to enable sophisticated users to organize and maintain the shared language components that exist within the document. The system does not limit novice users. Users who are unfamiliar with the system are still able to perform their word processing tasks.

By functioning in an unobtrusive manner, the system allows authors to focus their energies on their current problem. For example, if a prospectus is on a tight deadline, users will want to focus their energies on quickly making the required changes. Once the prospectus is out the door, users will want to spend the time required to update the library to reflect the new language in the prospectus.

There are several important factors to developing a successful system for maintaining consistent legal language. The solution should provide a useful model for managing commonly used language. The solution should provide tools that make it easy for users to maintain and make use of legal language stored in the library. The success of the system also critically depends upon the users. Users must make a commitment to use the system and create meaningful, re-usable legal language.

The illustrative document authorizing system provides the user with a series of functions and manages different types of information. One type of information the system manages is called a library. The library stores all information relevant to the authoring process. This includes documents, components, and attributes such as revision comments, regulatory information related to components, etc.

The system also manages documents. Users create and revise documents, which contain language components. The system helps keep track of changes to documents as well as the components within documents.

Document classifications are another type of information that the system manages. Document classifications are used to categorize documents, and more than one classification can be used for a document. For example, the classifications "bond" and "fixed income" could be used to classify a prospectus. Document classifications can be used to search for documents in the library. In addition document classifications are used identify new language components that may be relevant to a document. The system does not impose any restrictions on the classifications that are used.

The system also manages components. The system breaks down legal language into re-usable language components that are stored in a shared library. These language components can be shared among any number of documents. Changes in a language component in one document can optionally be added to another document that shares the component.

Component Classifications are a further kind of information that the system manages. Component classifications are used to categorize language components. More than one classification can be used for a component. Components classifications can be used to search for components in the library. In addition, component classifications are used to identify those documents that should be automatically notified when the component changes. The system does not impose any restrictions on the classifications that are used.

The system manages questionnaires as well. Questionnaires are used to manage the variable text in a document that changes between revisions. Typically this information is provided by a single outside source. For example, the financial accounting group must provide legal with the latest numbers each time a prospectus is updated. The system helps to manage this process by allowing legal to create a questionnaire that is sent to financial accounting each time the prospectus is updated. Once the questionnaire is filled in, those areas of the prospectus that contain the variable text are updated when instructed by the user.

The system provides an editing environment that gives the user access to a number of features. Once of the challenges of the system is that it must strike a balance between language control and editing flexibility. The following features help achieve this goal.

All text must be part of a component. The system maintains control over the language in the document by ensuring that the author is always entering text in a language component. Having all text in the document in a language component insures that all of the text in the document will end up in the library.

The document can be changed without interacting with the library. All changes to language components are tracked by the system. The changes don't need to be saved to the library immediately. The only requirement is that the changed components must be saved to the library before the document can be saved to the library.

All components must be saved to the library. When the text of a component is changed the system records that the component has changed. The system will not save the document to the library until all changed components have been saved.

Component boundaries are easy to identify. The author can turn on component boundaries in order to easily identify the components in the document. This will make it easy to insert new text into the appropriate language component.

Text can be copied into the document. The system recognizes all complete language components that are copied from one document to another. Text can also be copied from non-library documents and inserted into existing language components.

Note that while specific features have been described in connection with the illustrative embodiment, it will be within the level of one of skill in the art to create embodiments with somewhat different feature sets. Not all of the commands described will be needed to provide a useful electronic document authoring system in accordance with the invention. And minor differences in or simplifications of the appearance of the dialogs and other user interface features may alter or enhance the operation ease of use of the system in particular circumstances.

The system can also provide a tree viewer to directly manage documents without requiring the word processor. Referring to FIG. 28, the tree viewer displays documents 242, 250, 252 which can expand to reveal components 244, 246, 248. Users can create and modify documents by dragging and dropping language component icons. Documents are created by dragging and dropping language components into a list for the document. Once the list has been created, the actual word processor document with a complete content can be generated by the click of a button. This type of system can support a variety of word processor formats (Word, WordPerfect, etc.).

The system can also allow the user to assemble new document prototypes by compiling components. For example, language satisfying certain legal requirements may be necessary in a certain type of document. The user can use the tree interface to create a prototype for this type of document that includes the components that satisfy these requirements. To create a new document of this type, the user can use the system to copy the prototype. Documents created using prototypes will use components that can be modified by others working on documents in the same way that other documents will.

The present invention has now been described in connection with a number of specific embodiments thereof. However, numerous modifications which are contemplated as falling within the scope of the present invention should now be apparent to those skilled in the art. Therefore, it is intended that the scope of the present invention be limited only by the scope of the claims appended hereto.

What is claimed is:

1. A method of generating electronic documents, comprising:

maintaining a library of textual components, displaying a first textual document including a first plurality of the textual components in a word processor window, responding to user input by a first user to an interface of the work processor to edit the first textual document while the document is displayed in the word processor window, maintaining a database of marks identifying each of the components within the document displayed in the word processor window, displaying a second textual document including a second plurality of the textual components in a word processor window, responding to user input by a second user to the interface of the word processor to edit the second textual document including a second plurality of the textual components the first plurality including one or more textual components from the second plurality, detecting when one of the textual components that belongs to both the first plurality of textual components and the second plurality of textual components is updated in one of the first and second textual documents, prompting the user of the other of the first and second textual documents to accept or reject changes made to the one of the textual components, in response to the step of updating, generating in response to user input to the interface of the word processor a second version of the first textual document that includes textual components that were updated in the step of updating, and generating in response to user input to the interface of the word processor a second version of the second textual document that includes textual components that were updated in the step of updating.

2. The method of claim 1 wherein the steps of generating each include a step of prompting the user to accept or reject component updating for each of the components to be updated.

3. The method of claim 2 wherein the step of prompting includes prompting the user to accept or reject each updated component to include in the first and second documents.

4. The method of claim 1 further including the step of automatically prompting the user to save changes to the components in the first document made during editing to the library upon detection of a user command to save the first document.

5. The method of claim 1 further including the steps of generating questionnaires, receiving user input to complete the questionnaires, and wherein the step of updating is responsive to the input to update at least a portion of the textual components in the ones of the records.

6. The method of claim 5 further including the step of generating, in response to user input, a report on when the questionnaires were last completed.

7. The method of claim 1 further including the step of generating, in response to user input, a report on which of the documents includes a particular one of the textual components in the library.

8. The method of claim 1 further including the step of generating, in response to user input, a report on which portions of the documents include flagged compliance text.

9. The method of claim 1 wherein the system maintains revision history and comments associated with the components in the library, and further including the step of displaying the revision history and comments in response to user input related to a particular one of the textual components in the library.

10. The method of claim 1 further including the step of displaying boundaries of the components in the first plurality in the word processor window.

11. The method of claim 1 wherein the step of maintaining the library maintains ones of the textual components in the library that include a plurality of variation fields, and further including the step of updating the variation fields in response to a user command.

12. The method of claim 1 wherein the step of maintaining the library maintains an indication of whether the updates to each of the components require review.

13. The method of claim 1 wherein the step of maintaining the library maintains a classification field, and further including the step of identifying to the user new components that may be relevant to one of the documents based on the classification field.

14. The method of claim 1 further including a step of responding to user input to the interface of the word processor to flag text in the documents.

15. The method of claim 1 wherein the step of maintaining the library maintains an expiration date field, and further including the step of preventing textual components associated with expired dates in their date fields from being included in the documents.

16. The method of claim 1 wherein a plurality of word processing commands and a plurality of commands related to the components in the library are available to the user simultaneously.

17. The method of claim 1 wherein the step of maintaining the library maintains a draft field to indicate whether textual information is in draft or final form.

18. The method of claim 1 further including the step of responding to a user copy command to create a third document from the first plurality of the components that make up the first document.

19. The method of claim 1 wherein the step of maintaining the library maintains information on each of the component's name, description, and classifications.

20. The method of claim 19 wherein the step of maintaining the library maintains information on each of the component's regulatory information, revision, comments, and its read only and review required status.

21. The method of claim 1 wherein the library communicates with the user interface over a computer network.

22. The method of claim 1 wherein the library communicates with the user interface over a global computer network.

23. The method of claim 1 further including the step of managing the documents in a document management system.

24. The method of claim 1 wherein the step of updating includes updating of components by a plurality of users using different computers.

25. The method of claim 1 further including the step of storing document prototypes including a plurality of components, and further including the step of creating the first document based on one of the document prototypes.

26. A textual document authoring system, comprising:
means for storing in storage a library of textual components and a database of marks identifying each of the components that is part of a first textual document,
means for displaying in a word processor window on a display responsive to the storage the first textual document including a first plurality of the textual components, and
a user interface for responding to user input by a first user to an interface of the word processor to edit the first textual document while the document is displayed by the means for displaying in the word processor window; for responding to user input by a second user to the interface of the word processor to edit a second textual document including a second plurality of the textual components, the first plurality including one or more textual components from the second plurality; for detecting when one of the textual components that belongs to both the first plurality and the second plurality is updated in one of the first and second textual documents; for prompting the user of the other of the first and second textual documents to accept or reject changes made to the one of the textual components, in response to updating of the one of the textual components; for responding to user input to the interface of the word processor to generate a second version of the first textual document that includes updated textual components; and means for responding to user input to the interface of the word processor to generate a second version of the second textual document that includes updated textual components.

27. The apparatus of claim 26 wherein the user interface further includes means for prompting the user to accept or reject component updating for each of the components to be updated.

28. The apparatus of claim 27 wherein the means for prompting includes means for prompting the user to accept or reject each updated component to include in the first and second documents.

29. The apparatus of claim 26 further including means for automatically prompting the user to save changes to the components in the first document made during editing to the library upon detection of a user command to save the first document.

30. The apparatus of claim 26 further including means for generating questionnaires, for receiving user input to complete the questionnaires, and for updating at least a portion of the textual components based on the questionnaires.

31. The apparatus of claim 30 further including the step of generating, in response to user input, a report on when the questionnaires were last completed.

32. The apparatus of claim 26 further including means for generating, in response to user input, a report on which of the documents includes a particular one of the textual components in the library.

33. The apparatus of claim 26 further including means for generating, in response to user input, a report on which portions of the documents include flagged compliance text.

34. The apparatus of claim 26 further including means for maintaining revision history and comments associated with the components in the library, and further including means for displaying the revision history and comments in response to user input related to a particular one of the textual components in the library.

35. The apparatus of claim 26 further including means for displaying boundaries of the components in the first plurality in the word processor window.

36. The apparatus of claim 26 further including means for maintaining ones of the textual components in the library that include a plurality of variation fields, and means for updating the variation fields in response to a user command.

37. The apparatus of claim 26 further including means for maintaining an indication of whether the updates to each of the components require review.

38. The apparatus of claim 26 further including means for maintaining a classification field, and further including menus for identifying to the user new components that may be relevant to one of the documents based on the classification field.

39. The apparatus of claim 26 further including means for responding to user input to the interface of the word processor to flag text in the documents.

40. The apparatus of claim 26 further including means for maintaining an expiration date field, and further including means for preventing textual components associated with expired dates in their date fields from being included in the documents.

41. The apparatus of claim 26 wherein a plurality of word processing commands and a plurality of commands related to the components in the library are available to the user simultaneously.

42. The apparatus of claim 26 further including means for maintaining a draft field to indicate whether textual information is in draft or final form.

43. The apparatus of claim 26 further including further including means for responding to a user copy command to create a third document from the first plurality of the components that make up the first document.

44. The apparatus of claim 26 further including means for maintaining information on each of the component's name, description, and classifications.

45. The apparatus of claim 44 further including means for maintaining information on each of the component's regulatory information, revision, comments, and its read only and review required status.

46. The apparatus of claim 43 further including a document management system to manage the documents.

47. The apparatus of claim 43 further including a plurality of workstations for updating the components by different users.

48. The method of claim 26 further including means for storing document prototypes including a plurality of components, and further including means for creating the first document based on one of the document prototypes.

* * * * *